United States Patent
Lee et al.

(10) Patent No.: US 12,054,569 B1
(45) Date of Patent: Aug. 6, 2024

(54) HIERARCHICAL PRINTED PRODUCT AND COMPOSITION AND METHOD FOR MAKING THE SAME

(71) Applicant: Triad National Security, LLC, Los Alamos, NM (US)

(72) Inventors: Matthew N. Lee, Los Alamos, NM (US); Nicholas G. Parra-Vasquez, Los Alamos, NM (US); Kyle J. Cluff, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 17/586,450

(22) Filed: Jan. 27, 2022

Related U.S. Application Data

(62) Division of application No. 16/265,641, filed on Feb. 1, 2019, now Pat. No. 11,267,920.

(60) Provisional application No. 62/625,901, filed on Feb. 2, 2018.

(51) Int. Cl.

| | |
|---|---|
| *C08F 222/20* | (2006.01) |
| *B22F 10/00* | (2021.01) |
| *B28B 1/00* | (2006.01) |
| *B29C 64/124* | (2017.01) |
| *B33Y 10/00* | (2015.01) |
| *B33Y 70/00* | (2020.01) |
| *B33Y 80/00* | (2015.01) |
| *C08F 222/10* | (2006.01) |
| *C09D 4/06* | (2006.01) |

(52) U.S. Cl.
CPC ............ *C08F 222/20* (2013.01); *B22F 10/00* (2021.01); *B28B 1/001* (2013.01); *B29C 64/124* (2017.08); *B33Y 10/00* (2014.12); *B33Y 70/00* (2014.12); *B33Y 80/00* (2014.12); *C08F 222/102* (2020.02); *C09D 4/06* (2013.01)

(58) Field of Classification Search
CPC .... C08F 220/20; C08F 222/102; B22F 10/00; B28B 1/001; B29C 64/124; B33Y 10/00; B33Y 70/00; B33Y 80/00; C09D 4/06
See application file for complete search history.

(56) References Cited

U.S. PATENT DOCUMENTS

| | | | |
|---|---|---|---|
| 3,229,759 A | 1/1966 | Grover | |
| 4,274,479 A | 6/1981 | Eastman | |
| 6,673,285 B2 | 1/2004 | Ma | |
| 8,101,139 B2 | 1/2012 | Therriault | |
| 8,574,340 B2 | 11/2013 | Bakker | |
| 9,415,562 B1 | 8/2016 | Schaedler | |
| 9,976,815 B1 | 5/2018 | Roper | |
| 10,494,721 B1 | 12/2019 | Robinson | |
| 11,161,957 B2 | 11/2021 | Chen | |
| 11,198,178 B2 | 12/2021 | Xu | |
| 2004/0226620 A1 | 11/2004 | Therriault | |
| 2006/0211802 A1 | 9/2006 | Asgari | |
| 2011/0278755 A1 | 11/2011 | Liu | |
| 2016/0145755 A1 | 5/2016 | Cook | |
| 2017/0182561 A1 | 6/2017 | Scancarello | |
| 2017/0184086 A1 | 6/2017 | Scancarello | |
| 2018/0142108 A1* | 5/2018 | Lewis | .............. B29C 64/209 |
| 2019/0204252 A1 | 7/2019 | Venugopal | |
| 2020/0200487 A1 | 6/2020 | Karesh | |
| 2020/0309469 A1 | 10/2020 | Maxwell | |
| 2021/0138552 A1 | 5/2021 | Hildreth | |
| 2021/0148645 A1 | 5/2021 | Shuck | |

OTHER PUBLICATIONS

Fantino et al., "3D Printing of Conductive Complex Structures with In Situ Generation of Silver Nanoparticles," *Advanced Materials*, vol. 28, pp. 3712-3717, Mar. 16, 2016.

Zhou et al., "Three-dimensional Printing for Catalytic Applications: Current Status and Perspectives," *Advanced Functional Materials*, vol. 27, 13 pages, Jun. 12, 2017.

Grote, "Additive Manufacturing of Hierarchical Porous Structures," https://www.osti.gov/biblio/1312627-additive-manufacturing-hierarchical-porous-structures, Aug. 30, 2016.

Kong et al. "3D Printed Bionic Nanodevices," *Nano Today*. 11(3): 330-350, Jun. 2016.

Mu et al., "Porous polymeric materials by 3D printing of photocurable resin", Materials Horizons, 3(4): 442-449, Feb. 28, 2017.

* cited by examiner

*Primary Examiner* — Jessica M Roswell

(74) *Attorney, Agent, or Firm* — Klarquist Sparkman, LLP

(57) ABSTRACT

Disclosed herein are embodiments of a printable composition that can be used to make printed products of a chosen material chemistry that have different levels of porosity within the printed product's structure Also disclosed herein are embodiments of a printed product that has multiple levels of porosity throughout its structure, which can include a macroscale level of porosity, a microscale level of porosity, a nanoscale level of porosity and any combination thereof. These printed products can be made using a 3-D printer and can be made from a single printable composition without the need to add different structural components during the production process. Also disclosed herein are embodiments of a method for making and using a printed product.

4 Claims, 11 Drawing Sheets

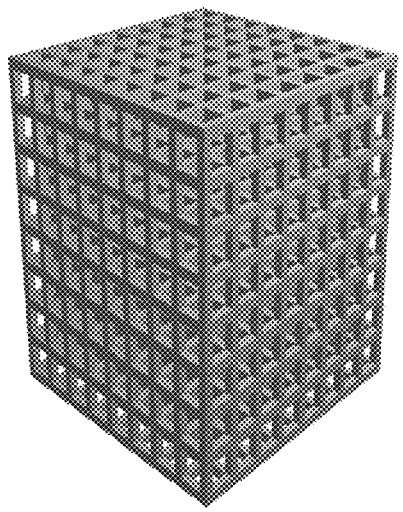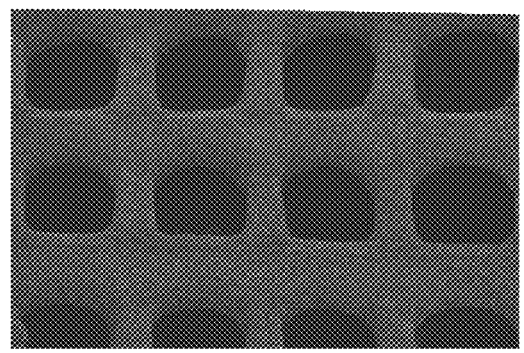
FIG. 6A　　　　　　　　　　　FIG. 6B
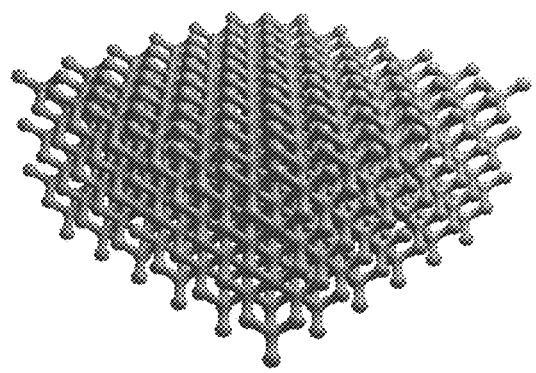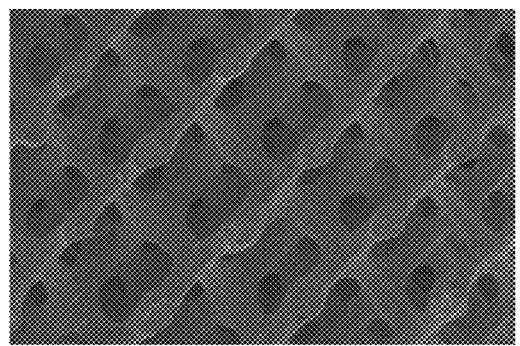
FIG. 7A　　　　　　　　　　　FIG. 7B

US 12,054,569 B1

HIERARCHICAL PRINTED PRODUCT AND COMPOSITION AND METHOD FOR MAKING THE SAME

CROSS REFERENCE TO RELATED APPLICATION

This application is a divisional of U.S. application Ser. No. 16/265,641, filed on Feb. 1, 2019, which claims the benefit of the earlier filing date of U.S. Provisional Patent Application No. 62/625,901, filed on Feb. 2, 2018; this prior application is incorporated herein by reference in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure concerns embodiments of a hierarchical printed product and embodiments of a composition and method for making the same.

BACKGROUND

Porous materials are ubiquitous in modern industrial civilization and widely utilized in catalysis, energy systems, separation process, medicine, heat transfer, etc. As these technologies progress forward, sophisticated and efficient synthetic methods have emerged for producing structures with a nanoscopic structure, high surface area, and engineered material functionality. More specifically, a surge of experimental studies on hierarchically porous solids has been observed in the past decade—these materials are designed to possess both large-scale porosity that facilitate fluid transport, with "textured" walls made up of much smaller meso or nanopores with high active surface area. This morphology is suited for the host of current technologies that rely on intimate contact at solid/fluid interfaces (e.g., batteries and fuel cells, separation media, heat exchangers, heterogeneous catalysts, etc.). Minimizing transport-limited behavior in porous structures remains a challenge in materials science, and while targeted R&D efforts toward new materials with multi-scale features and porosity has driven rapid progress in academia, there are exceedingly limited synthetic techniques that are scalable, manufacturable, and adaptable to different designs of either chemical functionality and structure.

SUMMARY

Disclosed herein are embodiments of a printable composition, comprising a structural precursor component; a polymer precursor component; and a porogenic solvent. In some embodiments, the structural precursor component can comprise a metal or a metal precursor; a polymer or a monomer precursor to the polymer; a pre-ceramic material; a pre-metal oxide; a carbonaceous material or a precursor thereof; or any combination thereof. Some embodiments of the composition further comprise a terminating compound, a reducing agent, an initiator, or any combinations thereof.

Also disclosed herein are embodiments of a method for making a printed product using the printable composition embodiments disclosed herein. Steps of method embodiments of the present disclosure are discussed herein. Also disclosed are embodiments of a printed product comprising a structural component having a combination of macroscale pores and/or channels and microscale pores and/or channels, or a combination of macroscale pores and/or channels and nanoscale pores and/or channels, or a combination of microscale pores and/or channels and nanoscale pores and/or channels, or a combination of macroscale pores and/or channels, microscale pores and/or channels, and nanoscale pores and/or channels.

The foregoing and other objects and features of the present disclosure will become more apparent from the following detailed description, which proceeds with reference to the accompanying figures.

BRIEF DESCRIPTION OF THE DRAWINGS

FIGS. 6A and 6B are images illustrating a macroscale level of porosity that be formed in printed product embodiments described herein (FIG. 6A) and the additional levels of porosity present in the macroscale level of porosity (FIG. 6B).

FIGS. 7A and 7B are images illustrating a macroscale level of porosity that be formed in printed product embodiments described herein (FIG. 7A) and the additional levels of porosity present in the macroscale level of porosity (FIG. 7B).

FIG. 10A is a digital image showing the macrostructure of the gold-based printed product; FIG. 10B shows a flow-through device comprising the gold-based printed product; FIG. 10C is an SEM image showing pores of the gold-based printed product on a 500 μm scale; FIG. 10D is an SEM image showing pores of the gold-based printed product on a 100 μm scale; FIG. 10E is an SEM image showing pores of the gold-based printed product on a 2 μm scale; and FIG. 10F is an SEM image showing pores of the gold-based printed product on a 500 nm scale.

FIG. 11A shows the macrostructure of the silica-based printed product; FIG. 11B shows a zoomed image of the macroscale pores of the silica-based printed product; FIG. 11C is an SEM image showing pores of the printed product on a 100 μm scale; FIGS. 11D and 11E shows a second level of porosity in the product and confirms that this additional level of porosity exists on length scales smaller than the macroscale pores.

FIGS. 14A and 14B are SEM images showing pores of a copper-based printed product made according to a method embodiment of the present disclosure, wherein FIG. 14A shows the pores on a 200 μm scale and FIG. 14B shows the pores on a 5 μm scale.

FIG. 15A shows a digital image of the iron-based printed product; 15B is an SEM image showing pores of the iron-based printed product on a 200 μm scale; and FIG. 15C is an SEM image showing pores of the iron-based printed product on a 10 μm scale.

DETAILED DESCRIPTION

I. Overview of Terms

Figure 1:
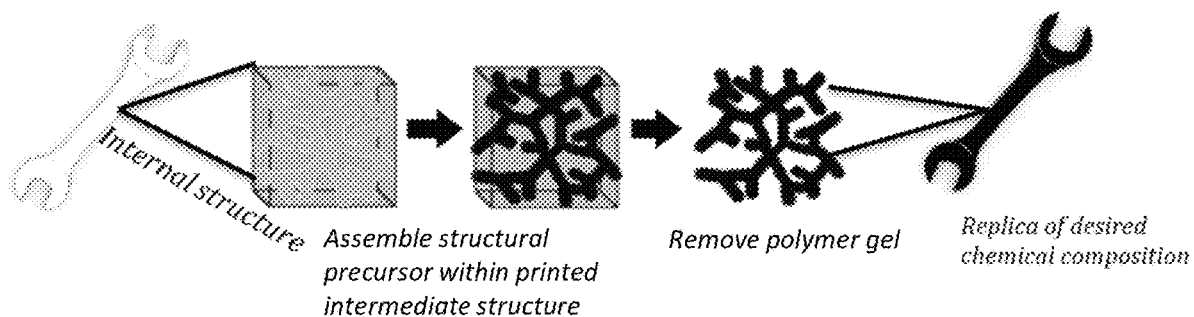
FIG. 1 is a schematic diagram illustrating using a printable composition as discussed herein to make a printed product wherein a polymer precursor is used in the printable composition to provide a polymeric structure upon polymerization, which ultimately is decomposed to reveal a structure made predominantly of a structural component described herein.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms and abbreviations are provided:

Channel: A fabricated or naturally occurring pathway created in a printed product described herein through which fluid can flow, wherein the channel has walls defined by the printed product. In some embodiments, a channel is formed by connectivity of two or more pores. In some embodiments, a channel has two dimensions of limited length and one dimension of unspecified length (e.g., such a channel could traverse the printed product in a tortuous path of unspecified length). In some embodiments, classification of the channel can be defined by the limiting dimensions. In some embodiments, channels can be macrochannels, microchannels, or nanochannels. The term "macrochannels," as used herein, is understood to refer to channels having dimensions greater than 1 mm to 100 mm or more. The term "microchannels," as used herein, is understood to refer to channels having dimensions of greater than 1 μm to 1000 μm. The term "nanochannels," as used herein, is understood to refer to channels having dimensions of from 1 nm or lower to 1000 nm.

Initiator: A compound that is capable of initiating or promoting the formation of one or more radical species and/or ionic species from a polymer precursor component.

Gas-Phase Reagent: A gas that can be used in method embodiments of the present disclosure to initiate or otherwise cause a chemical change in a structural precursor component such that the structural precursor component is converted to a structural component that becomes a majority component of a printed product.

Monomer Unit: A single monomer species, or an oligomer species (comprising one or more monomer species that are the same or different), or any combination thereof, that provides a polymerizable unit that serves as a polymer precursor component. Solely by way of example, polyethylene glycol diacrylate is a monomer unit comprising an oligomer of ethylene glycol units that can serve as a polymer precursor component that can be polymerized to provide a polyethylene glycol polymer.

Polymer Gel: A composition comprising a polymer network formed from polymerizing a polymer precursor component of a printable composition in the presence of a porogenic solvent (or "porogen").

Polymer Precursor Component: A compound that comprises one or more functional groups capable of polymerizing to form a polymeric structure, wherein the compound is a separate and distinct component from any structural precursor component of the printable composition. In an independent embodiment, the polymer precursor component is not methylcellulose or poly(vinyl) alcohol.

Polymerization Quenching Compound: A compound that is capable of preventing or reducing any undesired polymerization of the polymer precursor component. In some embodiments, the polymerization quenching compound (i) prevents polymerization from extending beyond a treatment pattern used print a printed intermediate structure, such as by preventing radical formation in regions not within the treatment pattern, (ii) prevents polymerization from increasing the thickness of printed layers of the printable composition beyond a desired thickness (e.g., thickness above the height of a printing plane along the z-axis), and/or (iii) scavenges radicals to thereby terminate polymerization. In some embodiments, the polymerization quenching compound can be a radical scavenger or an absorber compound.

Porogenic Solvent (or Porogen): A solvent in which a polymer precursor component exhibits low solubility such that any resulting polymer (that is, a polymer obtained from cross-linking and/or otherwise polymerizing the polymer precursor component) is phase-separated from the solvent, thereby forming pores and/or channels within a printed structure. In particular disclosed embodiments, the degree of solubility of the polymer precursor component in the porogenic solvent influences the pore size and structure. For example, the more soluble the polymer precursor is in the porogenic solvent, the smaller the resulting pore sizes will be. Exemplary porogenic solvents include, but are not limited to, dimethylformamide, water, DMSO, alcohols, esters, ketones, glycols, aldehydes, hydrocarbons, weak acids, and weak bases. In an independent embodiment, the porogenic solvent is not acetone, chloroform, or dichloromethane. In particular embodiments, the porogenic solvent (or porogen) is not or is other than a compound Pore: One of a plurality of openings or void spaces in a printed structure or printed product described herein. Pores, as described herein, are characterized by their diameters. Macroscale pores include large pores having diameters ranging from greater than 1 mm to 100 mm or more. Microscale pores include small pores having diameters ranging from greater than 1 μm to 1000 μm. Nanoscale pores include very small pores having diameters ranging from 1 nm or lower to 1000 nm. In some representative embodiments, the pores may have diameters ranging from 100 μm to 1 mm, or from 100 nm to 1 μm.

Printable Composition: A composition having chemical and/or physical properties (e.g., dispersibility, viscosity, flowability, and the like) sufficient to allow the composition to be printed using a 3-D printer or other stereolithographic process.

Printed Intermediate Structure: A structure formed by printing a printable composition and that comprises (i) a polymer gel and a structural precursor component; or (ii) a polymer gel and a structural component provided by reaction of the structural precursor component. In particular embodiments, a printed intermediate structure is a structure obtained after printing a printable composition and prior to removing a polymer gel.

Printed Product: A structure that comprises a structural component provided by a structural precursor component of the present disclosure and that is free of a polymer gel or that is substantially free of a polymer gel, such that only trace amounts of the polymer gel are detectable in the printed product, with such trace amounts being amounts that do not lead to deleterious effects on the performance of the printed product. Solely by way of example, trace amounts of the polymer gel can be amounts less than 10 wt % of the printed product, such as less than 8 wt %, less than 6 wt %, less than 4 wt %, or less than 2 wt %.

Structural Precursor Component: A component (or a combination of components) that is a chemical or physical precursor to the free-standing structural component of a printed product as described herein and that is separate and distinct from any polymer precursor component present in a printable composition. In particular embodiments, the structural precursor component itself is not present in the printed product and instead is transformed into a structural component that makes up the majority of the skeleton of the printed product (or if present is only present in trace amounts relative to the structural component made therefrom).

Vapor-Phase Reagent: A component that exists in the gas phase at a temperature lower than its critical temperature and that can be used in method embodiments of the present disclosure to initiate or otherwise cause a chemical change in a structural precursor component such that the structural precursor component is converted to a structural component that becomes a majority component of a printed product.

II. Introduction

Stereolithography methods typically are limited to producing plastic or polymeric products. Post-processing has been used in the art to convert printed plastic or polymeric products to a different material with the same structure; however, products made using such methods do not have controlled surface area and connectivity. That is, they do not have control over more than one length scale.

The present inventors have developed a materials synthesis process for embodiments of a 3-dimensional printed product with engineered porosity across multiple length scales (referred to herein as a "printed product" and/or a "hierarchical printed product"). Method embodiments described herein include stereolithography-based methods, which involve incorporating reactive species into printable compositions that may be printed using commercial stereolithography devices. In some embodiments, these printable compositions are produced by combining cross-linkable polymer precursor components with specific solvents that result in partial phase separation of polymerized material (formed from polymerization of the polymer precursor component) from the solvent during polymerization. This concept of using a polymerizable polymer precursor component in the presence of a poor solvent acting as a "porogenic solvent" is implemented to make a variety of polymer gels having pores and/or channels wherein the pore and/or channel size and volume may be controlled by tuning the porogenic solvent's affinity for the monomer, the concentration of porogen, and the use of additives, such as surfactants or other structure-directing agents. In some embodiments, after printing the printable composition, a printed intermediate structure is obtained and various different processing steps can be used to fill or cast the printed intermediate structure with material precursors described herein that are present in the printable composition and that give rise to the materials, such as metals, ceramics, metal oxides, polymers, carbonaceous materials, and the like, that make up the final printed product. The inventors are able to obtain homogeneous incorporation of the structural precursor component within the walls of a 3-D printed intermediate structure that can be converted to a final printed product, such as by decomposing a polymer gel of the printed intermediate structure. With such method embodiments, a structural replica of the printed intermediate structure is provided, which enables a "positive" replica of the 3-D printed intermediate structure, and a "negative" replica of the polymer gel formed within its walls (for example, see FIG. 1).

Not only can a designed product architecture be produced reproducibly, but different levels of porosity and/or channels can be included in the printed products, which enables the properties of different scaled products to be utilized. Additionally, pores of the disclosed printed products are interconnected and multimodal and thus are accessible throughout macroscale features of the printed products (that is, they are not isolated or "closed off" from the bulk void space). This synergy of additive manufacturing with macro-, micro-, and/or nano-structured materials can provide printed products with improved capabilities for an array of current and future technologies.

III. Printable Composition for Forming Printed Product Embodiments

Disclosed herein are embodiments of a printable composition that can be used to form embodiments of a printed product, such as embodiments of a hierarchical printed product. In some embodiments, the printable composition embodiments described herein provide an advantage over conventional compositions used for three-dimensional printing of porous structures because the disclosed composition comprises all components that provide a final printed product that contains multiple different levels of porosity spanning multiple length scales. For example, compositions typically used for printing porous products require first printing a plastic-based component that serves as a mold on which a metal-based composition is coated, followed by removal of the plastic component to ultimately provide the final metal-based product. As such, these conventional compositions do not include all components used to make the final product.

In contrast, embodiments of the disclosed printable composition provide the components used to arrive at a final printed product such that all the components are included in the printable composition and there is no need to add additional components in subsequent stages. As such, the printed product can be printed directly without having to add additional components and/or coatings. Embodiments of the disclosed printable composition thus provide at least this advantage over other compositions. Also, the disclosed printable composition is designed such that the various components of the printable composition can be modified using various processing steps to provide a final printed product that has controlled structural and compositional features. For example, components of the printable composition can be selected such that they will provide reactive species directly into a printed intermediate structure. These components and/or reactive species can then be modified using downstream processing techniques, without having to add additional compositional components, to provide printed products that have specifically designed internal structural features, such as controlled pore and/or channel sizes and shapes, controlled porosity levels, controlled pore and/or channel organization, and combinations thereof, that cannot be achieved in the art by other compositions/methods. As such, embodiments of the disclosed printable composition and method provides the ability to assemble printed products from the inside-out rather than simply overcoating a pre-printed product; a feature that has not been achieved to produce free-standing replicas of a desired chemistry with other printing compositions/methods.

In some embodiments, the printable composition comprises a structural precursor component, a polymer precursor component, and a porogenic solvent. In some embodiments, the printable composition can further comprise an initiator and/or a polymerization quenching compound component. The structural precursor component typically is the component that makes up the bulk of the printed product formed from the printable composition. The structural precursor can be selected from a metal (or a precursor thereof), a carbonaceous material (or a precursor thereof), a pre-ceramic material, a polymer (or a monomer precursor thereof), a pre-metal oxide material, or combinations thereof.

In embodiments where a metal (or precursor thereof) is used as the structural precursor component, the metal (or precursor thereof) used in the printable composition can be an alloy, a metal nanoparticle (or plurality of nanoparticles), metal ions in solution, or a non-ionic metal. Exemplary metals (or precursors thereof) that can be used include, but are not limited to, compounds having metals of Groups 9, 10, 11, 12, 13, and 14. In particular disclosed embodiments, the metal is silver, gold, nickel, copper, iron, palladium, platinum, zinc, or a combination thereof. Metal ions in solution can comprise metal salts that give rise to a metal species (e.g., reduced metal ions, colloidal metals, metal nanoparticles, etc.) after a chemical reaction (e.g., reduction via a reducing agent and/or hydrothermal synthesis methods) and/or heat treatment. Exemplary metal precursors include, but are not limited to, silver salts (e.g., silver nitrate, silver carbonate, silver halides, silver cyanide, silver phosphate, and the like); gold salts (e.g., gold(III) bromide, gold(I) chloride, gold(III) chloride, gold(III) chloride hydrate, gold(III) hydroxide, gold(I) iodide, potassium gold (III) chloride, and the like); nickel salts (e.g., nickel(II) bromide, nickel(II) chloride, nickel(II) fluoride, nickel(II) hydroxide, nickel(II) iodide, nickel(II) nitrate hexahydrate, nickel(II) oxalate dihydrate, nickel(II) sulfate, and the like); iron salts (e.g., iron(II) bromide, iron(III) bromide, iron(II) chloride, Iron(II) oxalate dehydrate, and the like); palladium salts (e.g., palladium(II) salts, like palladium bromide, palladium chloride, palladium cyanide, palladium iodide, palladium sulfate, palladium nitrate dehydrate, and the like); platinum salts (e.g., platinum(II) or platinum(IV) salts, like platinum bromide, platinum (II or IV) chloride, platinum iodide, platinum cyanide, and the like); copper salts (e.g., copper(I) or copper(II) salts, such as copper(I or II) bromide, copper(I or II) chloride, copper fluoride, copper iodide, copper nitrate, copper sulfate, copper thiocyanate, and the like); and zinc salts (e.g., zinc bromide, zinc chloride, zinc cyanide, zinc fluoride, zinc methacrylate, zinc nitrate, zinc iodide, and the like).

Structural precursor components comprising a metal precursor can also comprise a suitable solvent that is capable of solubilizing the metal precursor, such that it can be printed using a stereolithographic process. In some embodiments, the amount of the metal precursor used can selected based on the type of product that is desired. For example, in embodiments where the majority of the final printed product's structure is metal-based, large concentrations of the metal precursor (e.g., stoichiometric amounts and/or an amount that results in a saturated solution of the metal precursor in the solvent) can be used. In some embodiments, lower amounts of the metal precursor component can be used (e.g., less than stoichiometric amounts and/or amounts where a solution of the metal precursor is not saturated).

In yet some additional embodiments, a combination of two or more metal precursors can be used in tandem, such as a combination of silver and gold precursors. In some such embodiments, one of the metal precursors can be used to provide an additional layer of porosity within the final printed product, which can result from a de-alloying interaction between a combination of the two or more metals (or precursors thereof). In an exemplary embodiment, a silver precursor can be used in combination with a gold precursor to provide a gold-based printed product having three different levels of porosity (see, for example, FIG. 2). In such embodiments, the pores arise from the printed intermediate structure itself, the decomposition of the polymer gel, and the de-alloying of the Ag/Au alloy either by free corrosion in solution or by electrochemical methods (in order of largest to smallest in size). In such embodiments, the starting alloy composed of Ag and Au metal can comprise 20-50 at % Au (such as 20 at % to 36 at % (or higher) Au, or as between 22 at % and 26 at % (or higher) Au) to permit the formation of continuous nanoscale pores. In some embodiments of a product comprising a combination of gold and silver, the method used to make the product provides the ability to avoid formation of a dense silver layer formed around the pores, which can prevent suitable gold deposition. Because method embodiments of the present disclosure are able to avoid this silver layer formation around the pores, products exhibiting contamination (such as in the form of residual Cl contamination) are avoided. Such contaminated products do not exhibit accessible interior pores and thus can deleterious affect post-processing steps; thus, at least one advantage of the presently disclosed product and method embodiments is to avoid this undesirable outcome.

In embodiments where a carbonaceous material is used as the structural precursor component, the carbonaceous material can include graphite, graphene, and amorphous carbon; or it can be formed from a carbonaceous precursor, such as resorcinol and/or formaldehyde, furfuryl alcohol and the like (used either with or without a corresponding polymerization catalyst, such as sodium carbonate, oxalic acid, and the like).

In embodiments where a polymer (or monomer precursor thereof) is used as the structural precursor component, the polymer can be selected from polyimide, polyacrylonitrile, polydicyclopentadiene, polybenzoxazine, and the like. In additional embodiments, a monomer precursor of such polymers can be used, such as an imide monomer, an acrylonitrile monomer, a dicyclopentadiene monomer, a benzoxazine monomer, or any combinations thereof.

In embodiments where a pre-ceramic material is used as the structural precursor component, the pre-ceramic material can be used to form a printed product comprising a ceramic material, which is produced from the pre-ceramic material upon exposure to a catalytic hydrolysis step, removal of a polymer gel, and/or a high temperature treatment. The pre-ceramic material can comprise silicon (e.g., a silicon alkoxide, such as tetraethyl orthosilicate), titanium, boron (e.g., boric acid), aluminum, zirconium, or the like. In some embodiments, the ceramic material made from such pre-ceramic materials can comprise silica, SiC, SiOC, SiCN, $Si_3N_4$, TiC, boron nitride, boron carbide, aluminum nitride, zirconia, and the like.

In embodiments where a pre-metal oxide is used as the structural precursor component, the pre-metal oxide can comprise a metal (or salt thereof) belonging to Group 4, 5, 7, 8, 9, 10, 11, or 12 of the periodic table (or a combination of any such metals). In some embodiments, the pre-metal oxide material can be converted to a metal oxide component that makes up the skeleton of the printed product upon removal of the polymer gel of the printed intermediate structure, wherein the metal oxide can be selected from $TiO_2$, $MnO_2$, $SiO_2$, $SnO_2$, $ZrO_2$, $ZnO$, $NiO$, $BaTiO_2$, $ZnTiO_3$, $CuTiO_3$, $Fe_2O_3$, $Fe_3O_4$, $Co_3O_4$, $V_2O_5$, $CuO$, and the like. Exemplary pre-metal oxide compounds include any metal-containing salt that can be thermally decomposed to a corresponding oxide or that can be chemically converted to an oxide using a vapor-phase reagent, a gas-phase reagent, or a combination thereof. In some embodiments, the pre-metal oxide can include, but is not limited to a titanium oxide precursor (e.g., $TiCl_4$, $Ti[OCH(CH_3)_2]_4$, and the like); a cobalt oxide precursor (e.g., $Co(NO_3)_2 \cdot H_2O$, $CoCl_2$ and the like); a zirconium oxide precursor (e.g., $ZrOCl_2 \cdot 8H_2O$, $Zr(NO_3)_4$, and the like); a nickel oxide precursor (e.g., $Ni(NO_3)_2$, $NiCl_2$, a Ni(II)bis(phosphine) complex, a Ni(0) complex, $NiCp_2$, and the like); or a tin oxide precursor (e.g., $SnCl_2$, $SnI_4$, $Sn(acac)_2$, or the like). In some such embodiment, the metal oxide can be obtained from the pre-metal oxide component in situ by exposing a printed intermediate structure comprising the pre-metal oxide to water, a vapor-phase reagent (e.g., water vapor), a gas-phase reagent, or a combination thereof.

The polymer precursor component of the printable composition comprises one or more monomer units, wherein each monomer unit can be the same or different. Each monomer unit of the polymer precursor component can be a single monomer species (which can be the same [but with different polymer weights]), or an oligomer species (which can comprise a mixture of monomer species, which can be the same [but with different polymer weights]), or a mixture thereof. The monomer units typically comprise at least one, or two, or three, or four, or five polymerizable functional groups (e.g., functional groups that can be cross-linked and/or that can form radicals and/or ions upon exposure to light and/or heat). Such polymerizable functional groups include, but are not limited to, a double bond, an epoxide, an alkylene oxide, an isocyanate, and the like. In some embodiments, the polymer precursor component comprises one or more acrylic monomers suitable for use in stereolithography. In particular disclosed embodiments, the polymer precursor component can be selected from acrylate-containing monomers (such as, but not limited to, polyethylene glycol diacrylate [e.g., PEG(600)diacrylate], polyester acrylate, urethane acrylate, epoxy methacrylate, trimethylolpropane ethoxylate triacrylate, and the like, and including any combinations thereof) or vinyl group-containing monomers (such as, but not limited to, divinyl benzene, divinyl sulfone, divinyl oxybutane, and the like, and including any combinations thereof) that are easily polymerized with light.

The initiator component can comprise a compound that is capable of promoting polymerization of the polymer precursor component, such as by inducing ionic polymerization and/or radical polymerization. In some embodiments, the initiator component can comprise a cationic radical initiator (e.g., an onium salt, such as an iodonium salt, a sulfonium salt, or a combination thereof; an organometallic complex, such as a ferrocinium salt, or a pyridinium salt; or a combination thereof), or a free radical initiator (e.g., a benzophenone, a xanthanone, a quinone, a benzoin ether, an acetophenone, a benzoyl oxime, an acylphosphine, or a combination thereof). In particular disclosed embodiments, the initiator component can be selected from bis(2,4,6-trimethylbenzoyl)-phenylphosphineoxide, 2-hydroxy-4'-(2-hydroxyethoxy)-2-methylpropiophenone, 2-hydroxy-2- methylpropiophenone, 2-methyl-4'-(methylthio)-2-morpholinopropiophenone, [4-[(2-Hydroxytetradecyl)oxy]phenyl]phenyliodonium hexafluoroantimoniate, or the like and including any combinations thereof. The amount of the initiator component that is used can range from 0.001 wt % to 10 wt % (based on the mass of the monomer used to provide the monomer unit of the polymer precursor component or based on the total mass of the polymer precursor component), such as 0.1 wt % to 5 wt %, or 0.5 wt % to 1.5 wt %. In some embodiments, the initiator can be included at an amount that is 1% based on the mass of monomer used to provide the monomer unit of the polymer precursor component (or, in some embodiments, the total mass of the polymer precursor component). For example, assuming the monomer has a density of 1 g/mL, 10 mg of the initiator would be dissolved per 1 mL monomer used to provide the monomer unit of the polymer precursor component. In other embodiments, an example would be that for every 1 g of the polymer precursor component that is used, the initiator can be used in an amount of 0.1 g.

The printable composition also can comprise a polymerization quenching compound, which can be selected from a compound that is capable of preventing or reducing any undesired polymerization of the polymer precursor component (e.g., such that polymerization does not extend beyond the treatment pattern being used to print the product and/or such that the thickness of printed layers of the printable composition is controlled to be a particular desired thickness). In some embodiments, the polymerization quenching compound can be selected from a radical scavenger or an absorber, such as an azo-containing compound (e.g., an azo dye), or a compound capable of terminating ionic polymerization. In some embodiments when the polymerization quenching compound is a dye, the dye can competes for absorption of the incident light, preventing the formation of free radicals in areas where polymerization is not desired. In some embodiments, the polymerization quenching compound can be a dye, such as an azo-containing dye like a SUDAN® dye (e.g., SUDAN® I, SUDAN® II, SUDAN® III, etc.) or other visible- or UV-absorbing dye such as Oracet Yellow, Orasol Orange, and the like. In some embodiments, the amount of the polymerization quenching compound that can be used ranges from 0.001 wt % to 1 wt % based on the mass of the monomer used to provide the monomer unit of the polymer precursor component, such as 0.01 wt % to 0.1 wt %, or 0.1 wt % to 0.3 wt %. In some embodiments, the polymerization quenching compound is used in an amount that is 0.2 wt % based on the mass of the monomer used to provide the monomer unit of the polymer precursor component.

The porogenic solvent (or "porogen") is used to generate porosity in the printed product and typically provide the largest scale pores and/or channels present in the printed product (e.g., macroscale pores and/or channels). In some embodiments, the porogenic solvent can be selected from a solvent in which a polymerized polymer precursor component is minimally soluble. In some embodiments, the porogenic solvent is dimethylformamide, DMSO, water, an alcohol (such as ethanol, pentanol, hexanol, isopropanol, and like), a hydrocarbon (such as undecane, dodecane, and the like), an acid, a base (such as boric acid and the like), or any combinations thereof. In particular embodiments, the acid and/or base is a weak acid and/or weak base such that the acid and/or base is not so concentrated that it deleteriously interferes with a printing process and/or chemically degrades components of the printable composition. Solely by way of example, concentrated acids, such as concentrated nitric or sulfuric acid, are typically not considered weak acids unless they have been diluted to a lower concentration (e.g., lower than 10M, such as 8M or lower, 4M or lower, 2M or lower, or less than 1 M. In some embodiments, the porogenic solvent also is selected based on its ability to reduce a metal precursor component to a metal ion. However, in some other embodiments, a separate reducing agent can be used to promote reduction of a metal precursor. In embodiments where the porogenic solvent is used to promote reduction of a metal precursor, the amount of the porogenic solvent that is used can be selected so as to provide a particular ratio of porogenic solvent to metal precursor. In additional embodiments, the amount of the porogenic solvent can be selected based on the amount of the monomer used to provide the monomer unit of the polymer precursor component that is used. In some particular embodiments, the porogenic solvent is present in an amount ranging from 15-85% by volume, such as 20-50% by volume, or 20-30%. In embodiments using a reducing agent, the reducing agent is selected to be a chemical species that can reduce metal ions when a metal precursor is used as the structural precursor component. Exemplary reducing agents include, but are not limited to, sodium citrate, sodium hypophosphite, formaldehyde, ascorbic acid, sodium borohydride, hydrazine, and the like.

The particular components of the printable composition described above can be included together in separate compositions that are then mixed together to form the printable composition. In some embodiments, a first solution comprising a porogenic solvent can be made. In such embodiments, the first solution can further comprise an initiator and/or a polymerization quenching compound. In some embodiments, the first solution can further comprise a reducing agent. In some embodiments, a second composition can be used, which comprises the polymer precursor component. The second composition can, but need not, include a solvent. A third composition also can be used, which comprises a solution of the structural precursor component. In some embodiments, the third composition can comprise a metal precursor solution, a polymer (or monomer thereof) solution, a pre-ceramic solution, a carbonaceous material solution (or a carbonaceous material precursor solution), a metal oxide precursor solution, or any combination thereof. These different compositions can be modified either in terms of the components included within each composition or in terms of the order in which the compositions are combined, depending on the materials utilized when forming the printable composition. In some embodiments, the compositions are combined in an order that avoids forming an emulsion and/or that avoids the different compositions from separating in the printable composition. In some embodiments, the third solution can be combined with the porogenic solvent prior to adding the polymer precursor component. In yet additional embodiments, the structural precursor component can be dissolved in the porogenic solvent prior to adding the polymer precursor component. Solely by way of example, in some embodiments using a metal precursor as the structural precursor component, the first composition can be made using the initiator, the polymerization quenching compound, and the porogenic solvent. This first composition is then combined with a second composition comprising a polymer precursor component. This mixture of the first composition and the second composition is then combined with a third composition, which comprises the metal precursor solution. In such exemplary embodiments, the first composition, second composition, and third compositions are combined at a ratio of 4:2:1 (first composition:second composition:third composition).

In some embodiments, the volume of porogen used corresponds to the volume available to add other reactants and precursors to the printed intermediate structure as the other volume is already occupied by the polymer formed from the polymer precursor component. Solely by way of example, if the polymer precursor component is used at 25%, then the remainder of the volume (e.g., 75%) is made up of the porogenic solvent and any precursors dissolved or combined with the porogenic solvent. Solely as a representative example, a carbonaceous material can be used to forms the skeleton of the printed product. In this representative embodiment 25% by volume poly(ethylene glycol) diacrylate (e.g., MW 250), which acts as the polymer precursor component is combined with 75% by volume water (which acts as the porogenic solvent) and formaldehyde solution with dissolved resorcinol (which acts as the structural precursor component). In this representative embodiment, the initiator/absorber concentration relative to mass of the monomer unit (poly(ethylene glycol) diacrylate) that provides the polymer precursor component is 1% and 0.18%, respectively.

In an independent embodiment, if the printable composition comprises a polyethylene glycol monomer (e.g., a polyethylene glycol diacrylate, such as polyethylene glycol diacrylate with a molecular weight of 600 or 258), phenylbis (2,4,6-trimethylbenzoyl)phosphineoxide (also known as IRGACURE® 819), 1-phenylazo-2-naphthol (also known as SUDAN® 1), and isopropanol, pentanol, hexanol, and dibutyl phthalate (individually or all four in combination) then the printable composition does not comprise silver or silver nitrate without further comprising a second metal or metal precursor (e.g., gold or a precursor thereof).

In another independent embodiment, if the printable composition comprises a combination of resorcinol, formaldehyde, water, polyethylene glycol monomer (e.g., a polyethylene glycol diacrylate, such as polyethylene glycol diacrylate with a molecular weight of 600 or 258), phenylbis (2,4,6-trimethylbenzoyl)phosphineoxide, and 1-phenylazo-2-naphthol, then the resorcinol, formaldehyde, and water make up a volume % of the composition that is not, or is other than, 80%; and the polyethylene glycol monomer, phenylbis(2,4,6-trimethylbenzoyl)phosphineoxide, and 1-phenylazo-2-naphthol make up a volume % of the composition that is not, or is other than 20%.

IV. Printed Product Embodiments

Figure 2:
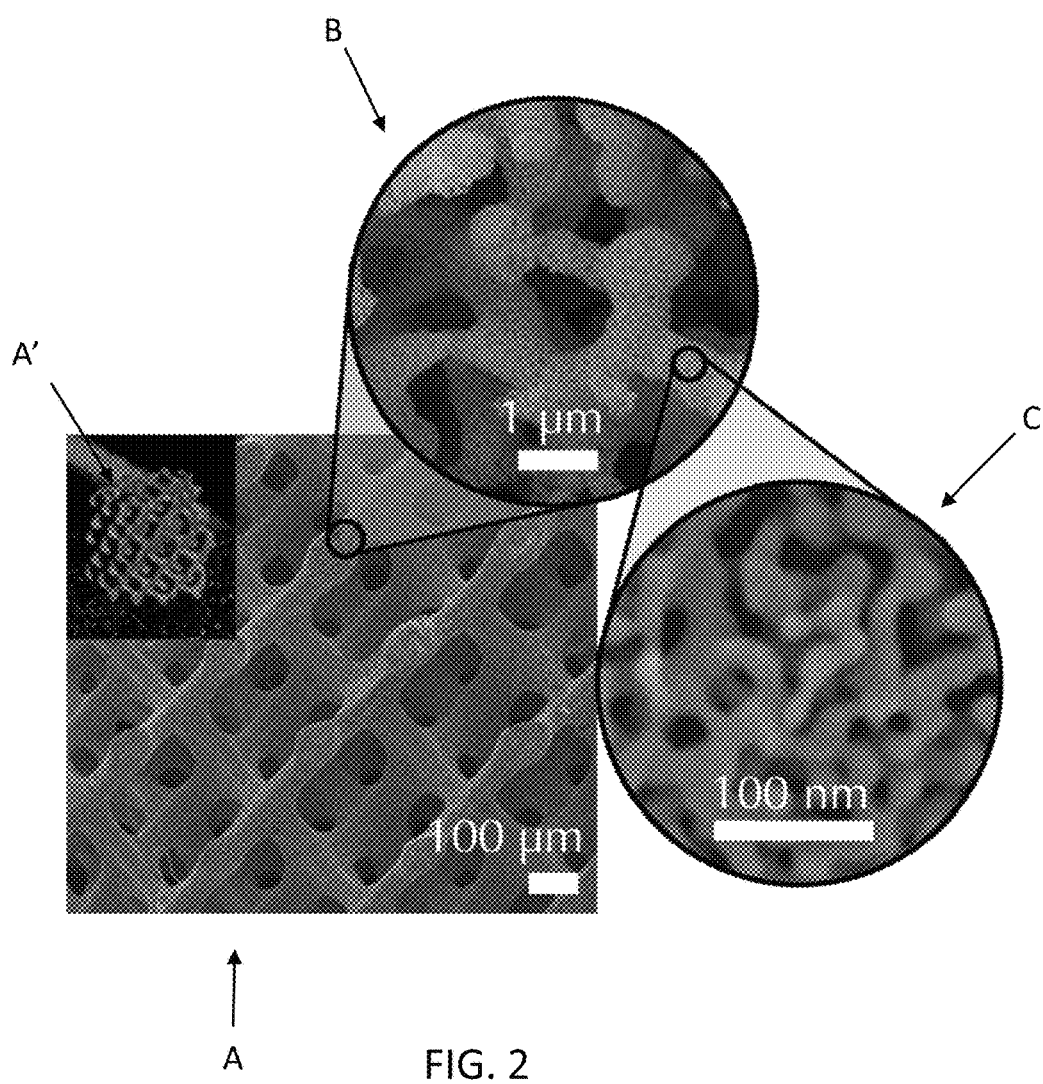
FIG. 2 is an SEM image illustrating a representative printed product comprising gold and that comprises three levels of porosity, wherein one level is pictured in the image labeled as "A"; a second level is pictured in the image labeled as "B"; and a third level is pictured in the image labeled as "C."

Printed product embodiments described herein comprise a three-dimensional structure that can comprise one or more levels of porosity, and typically two or more levels of porosity. In some embodiments, the printed product embodiments described herein have a three-dimensional structure that comprises two, three, four, five, or more levels of porosity throughout the structure. By "different levels of porosity" it is meant that the printed product can comprise regions having nested levels of porosity. Solely by way of example, a printed product as described herein can comprise a three-dimensional "macro" structure wherein structure features of the printed product define macropores and/or macrochannels. This "macro" structure can further comprise regions with additional levels of porosity and/or channels, such as regions comprising micropores, microchannels, nanopores, nanochannels, and any combinations thereof. In some embodiments, the regions can comprise microporous and/or microchannel regions, which themselves include nanoporous and/or nanochannel regions. An image of an exemplary product comprising multiple different levels of porosity is shown by FIG. 2. As shown by the insert of SEM image "A" in FIG. 2 (image "A'"), the product comprises a macro structure having a lattice-based configuration. This macrostructure (illustrated as SEM image "A" in FIG. 2) includes, within regions of the lattice-forming regions, an additional level of porosity as illustrated by SEM image "B" of FIG. 2. The pores of this region are on the microscale. Further, this microscale porous region itself includes an additional level of porosity as can be seen by SEM image "C" of FIG. 2. The pores of this region are on the nanoscale.

Figure 3:
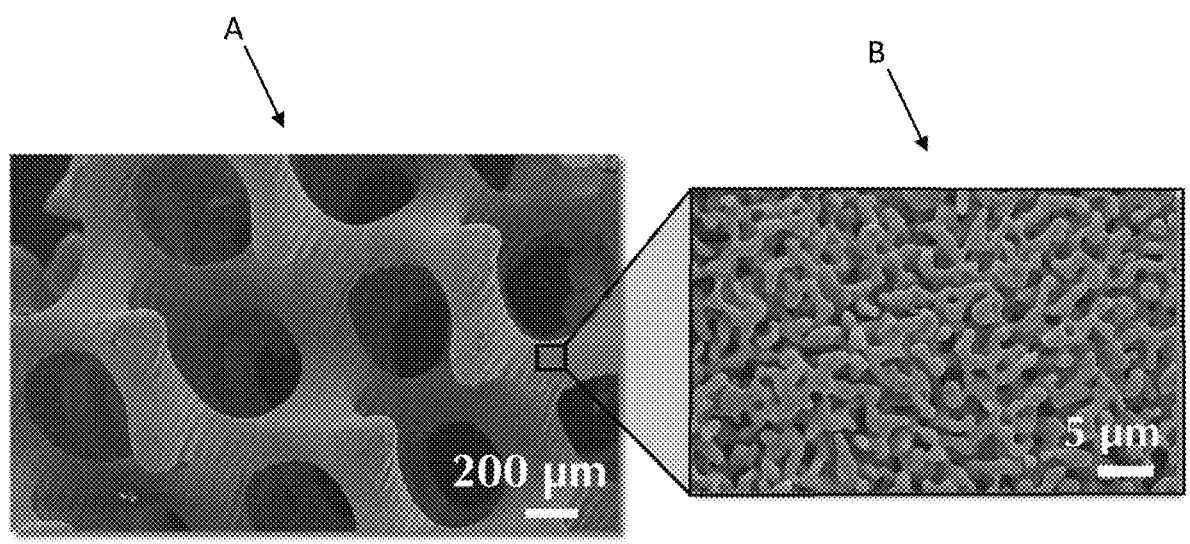
FIG. 3 is an SEM image illustrating a representative printed product comprising silver and that comprises two levels of porosity, wherein one level is pictured in the left-most image and the other level is pictured in the zoomed view of the left-most image.
Figure 4A:
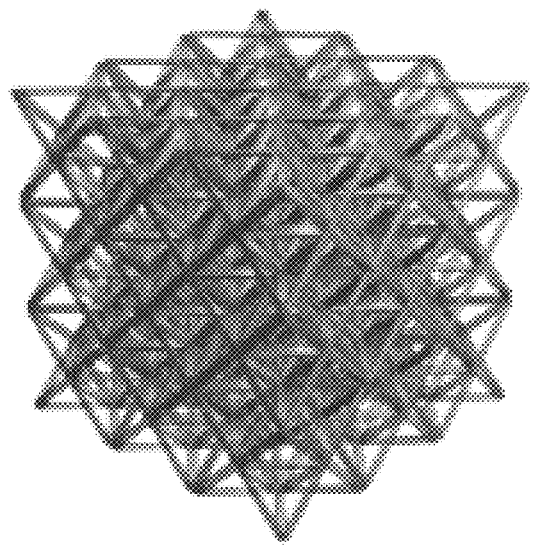
FIGS. 4A and 4B are images illustrating a macroscale level of porosity that be formed in printed product embodiments described herein (FIG. 4A) and the additional levels of porosity present in the macroscale level of porosity (FIG. 4B).
Figure 4B:
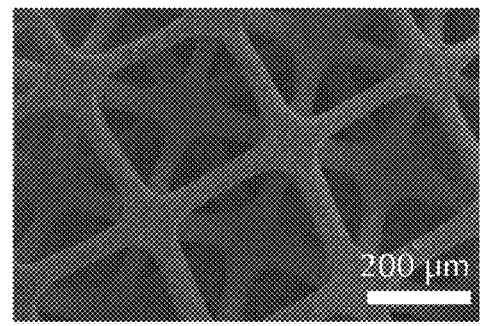
Figure 5A:
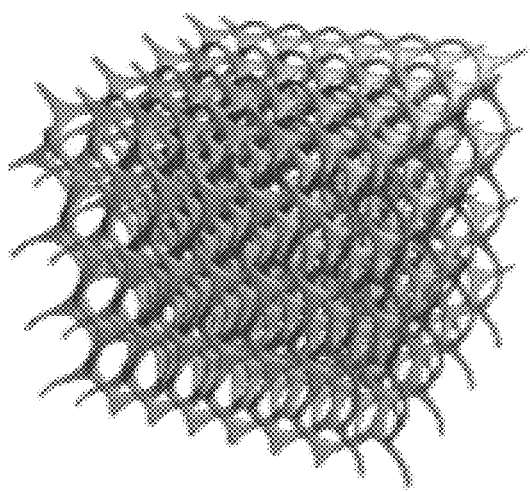
FIGS. 5A and 5B are images illustrating a macroscale level of porosity that be formed in printed product embodiments described herein (FIG. 5A) and the additional levels of porosity present in the macroscale level of porosity (FIG. 5B).
Figure 5B:
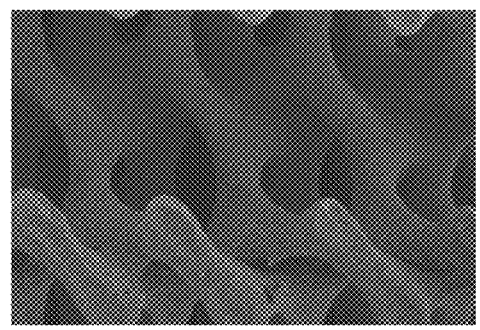

An additional embodiment of a product described herein is shown in FIG. 3. The product of FIG. 3 comprises two levels of porosity; a first level of porosity is shown in SEM image A of FIG. 3, which comprises a macroscale level of porosity. Regions of the product shown in SEM image A of FIG. 3 further include a microscale level of porosity, as illustrated in SEM image B of FIG. 3. Additional embodiments of the printed product having different levels of porosity are illustrated in FIGS. 4A, 4B, 5A, 5B, 6A, 6B, 7A and 7B. These images illustrate configurations of the macro structure of the product (FIGS. 4A, 5A, 6A, and 7A) and also show SEM images (FIGS. 4B, 5B, 6B, and 7B), which illustrate additional levels of porosity within the macro structure of the product (e.g., micro and nanoscale porous regions).

In some embodiments, pores present in the product embodiments described herein can be macroscale pores, microscale pores, nanoscale pores, and any combination thereof. In some embodiments, the product can comprise a gradient of pores such that pore size (e.g., pore diameter) decreases or increases along an axis of the product. In some embodiments, product embodiments can comprise channels, such macrochannels, microchannels, nanochannels, and any combination thereof. In some embodiments, the product embodiments can comprise a mixture of such pores and channels.

The product embodiments disclosed herein can be metal-based products, polymer-based products, ceramic-based products, carbonaceous material-based products, and combinations thereof. In some embodiments, products comprising multiple levels of porosity of a mixture of metals can be made, such as products comprising hierarchical levels of porosity comprising gold and silver. In some embodiments, the printed product comprises gold, silver, silica, boron carbide, copper, iron, carbon, or combinations thereof. In particular embodiments, the printed product is free of (or substantially free of) and polymer gel or polymer precursor component from the printable composition.

In some embodiments, the components that make up the printed product can be determined using elemental analysis techniques, such as energy dispersive X-ray spectroscopy (EDS), X-ray diffraction analysis (XRD), and the like. Also, the size of pores and/or channels present in the printed product can be determined using scanning electron microscopy (SEM).

V. Method of Making Printed Product Embodiments

Disclosed herein are embodiments of a method for making a printed product, such as a hierarchical printed product. In some embodiments, the method comprises preparing a first composition comprising an initiator, a polymerization quenching compound, a porogenic solvent, a reducing agent or any combination thereof. The method can further comprise preparing a second composition comprising a solution or neat composition of a polymer precursor component. The method can further comprise preparing a third composition comprising a structural precursor component. In yet some additional embodiments, the method comprises combining a first composition comprising an initiator, a polymerization quenching compound, a porogenic solvent, a reducing agent or any combination thereof with a polymer precursor component and a structural precursor component, in any order, to form a printable composition. In yet additional embodiments, the method can comprise forming a printable composition by combining an initiator, a polymerization quenching compound, a porogenic solvent, a polymer precursor component, and a structural precursor component in any order that avoids forming an emulsion or that avoids separation of one or more of the components. In yet additional embodiments, the structural precursor component can be added as a separate solution after printing a printed intermediate structure with a printable composition comprising the polymer precursor component. Representative embodiments can include copper-based printed product embodiments and iron-based printed product embodiments. In some embodiments, the components used to form the printable composition can be provided as pre-formed solutions that are simply mixed together in a suitable order. In yet additional embodiments, the components can be pre-mixed to form a printable composition that can be used without the user having to pre-form and/or pre-mix the various components of the printable composition.

The method can further comprise loading the printable composition into a 3-D printer, such as by placing a pre-prepared cartridge comprising the printable composition into the printer. The settings of the 3-D printer can be selected to provide a printed intermediate structure having any desired shape, thickness, and/or porosity. In some embodiments, such settings can involve selecting a particular energy source and intensity (e.g., a light source having an intensity suitable to promote polymerization of the polymer precursor component and/or a heat source having a temperature suitable to promote polymerization of the polymer precursor component), a particular printing orientation (e.g., selecting a printer with a bottom-up or a top-down orientation), etc. In some embodiments, the printer settings are selected so as to provide a printed intermediate structure, such as a printed intermediate structure having a lattice structure, a gyroid structure, or the like, using the printable composition. As printed layers of the printable composition are sequentially deposited to build the printed intermediate structure, the layers are exposed to the energy source, which polymerizes the polymer precursor component to form a polymer gel in which the structural precursor component is suspended. In other embodiments, the printable composition layers can be printed to provide a printed intermediate structure that is then exposed to a composition comprising a structural precursor component.

Once a printed intermediate structure has been formed using the printable composition, the printed intermediate structure can be further treated to remove any residual printable composition that may be present within pores of the printed intermediate structure and/or on any interior or exterior surfaces of the printed intermediate structure and that includes any non-polymerized polymer precursor. In some embodiments, any residual printable composition can be removed by wicking away the printable composition, such as by placing the printed intermediate structure in contact with an absorbing medium, such as a cloth or paper capable of absorbing fluid. In some embodiments, the printed intermediate structure also can be rinsed with a rinsing composition so as to ensure that the pores and/or channels formed within the printed intermediate structure are not blocked and/or filled. In some embodiments, it is desirable to have all the pores and/or channels accessible at all (or substantially all) points of the printed intermediate structure. The rinsing composition can comprise a solvent (e.g., a porogenic solvent that is the same or different from that used in the printable composition), a stabilizing component, or a combination thereof. In particular disclosed embodiments, the rinsing composition comprises a 3:1 mixture of the solvent to stabilizing component. The stabilizing component can be used in embodiments where it is desirable to stabilize (e.g., to prevent any further reaction and/or growth of the structural precursor) any of the structural precursor components that might be present on the outer surfaces of the printed intermediate structure. Solely by way of example, a stabilizing component, such as polyvinyl pyrrolidone (or "PVP"), can be used to prevent growth of some metal particles that might be on the exterior of the printed intermediate structure so that the pores of the printed intermediate structure are not blocked and rendered inaccessible from the outside of the printed intermediate structure. In some embodiments, the printed intermediate structure can be suspended (or dipped) in the rinsing composition or the rinsing solution can be deposited on the printed intermediate structure. In some embodiments, the amount of the rinsing solution that is used can be selected based on the size, shape, and/or porosity of the printed intermediate structure. In particular disclosed embodiments, the rinsing composition is used in an amount that allows the exterior surface and internal pores of the printed intermediate structure to be contacted by the rinsing composition. Solely by way of example, a printed intermediate structure that is 1 $cm^3$ in size and that has pores with a 250 μm diameter can be contacted with 1 to 2 mL (or more) of the rinsing composition.

Embodiments of the method can further comprise exposing the printed intermediate structure to a coating fluid, such as an oil (e.g., silicone oil or the like). This exposure step is used to coat the exterior of the printed intermediate structure and any internal pores and surfaces in preparation for any subsequent reaction steps. The coating fluid is selected to be immiscible with any remaining fluid that may be present in the printed intermediate structure (e.g., the porogenic solvent and/or solvents used to provide the structural precursor component). The coating fluid minimizes solvent evaporation and associated precursor transport (e.g. of metal ions) from inner regions of the printed intermediate structure to the exterior surfaces of the printed intermediate structure. In some embodiments, the printed intermediate structure can be placed in a container to which the coating fluid is then added in an amount sufficient to coat the printed intermediate structure. In some embodiments, a coating fluid is not needed.

In some embodiments, the method further comprises heating the printed intermediate structure. In embodiments using a coating fluid, the printed intermediate structure is heated after it has been exposed to the coating fluid. In such embodiments, the coating fluid can still be present. The heating step can be optional and whether it is used or not depends on the structural precursor component used in the printable composition. In embodiments using a heating step, the heating step can promote reduction of the structural precursor component to provide the material that becomes the structural base for the printed product. For example, in embodiments comprising a metal precursor, the heating step is used to reduce metal ions of the metal precursor in the presence of the additional components present in the printed intermediate structure (e.g., the porogenic solvent and/or any solvent used to dissolve the metal precursor component). In such embodiments, heating is carried out at a temperature and for a time sufficient to promote reduction of metal ions of the metal precursor. Solely by way of example, a printed intermediate structure comprising a silver-containing metal precursor (e.g., silver nitrate and silver ions produced therefrom) can be heated at 70° C. (or higher) for 4 hours or more to reduce any silver ions that are present. Without being limited to a single theory, it currently is believed that the following reaction may take place during the heating step of exemplary embodiments using a silver-containing metal precursor, DMF as the porogenic solvent, and water (used with the silver-containing metal precursor):

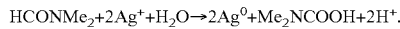

$HCONMe_2 + 2Ag^+ + H_2O \rightarrow 2Ag^0 + Me_2NCOOH + 2H^+$.

In some embodiments, the method can comprise exposing the printed intermediate structure to an alcohol (e.g., ethanol) to remove the coating fluid and any residual components still present in the printed intermediate structure (e.g., any porogenic solvent, heat treatment by-products, and the like). The printed intermediate structure can then be dried. A drying step can involve affirmatively removing the alcohol (e.g., by using heat or passing air or an inert gas over the printed intermediate structure), or it can be removed by simply allowing the alcohol to evaporate. At this stage of some method embodiments, the printed intermediate structure can comprise a composite material comprising the polymer gel formed from the polymer precursor component and the structural material formed from the structural precursor component that becomes the base material of the printed product. A first level of porosity can be obtained in this printed intermediate structure by decomposing the polymer gel present in the printed intermediate structure. In some embodiments, the polymer gel can be decomposed by exposing the printed intermediate structure comprising the composite material to an energy source, such as a heat source. In yet additional embodiments, the polymer gel can be decomposed using a chemical treatment. Upon decomposition of the polymer gel, additional pores and/or channels are provided in the printed intermediate structure, which were previously spaces within the printed intermediate structure that were occupied by the polymer gel prior to decomposition. In some embodiments, the energy source is a heat source capable of heating the printed structure at a temperature ranging from greater than room temperature to 700° C., such as 50° C. to 650° C., or 100° C. to 600° C., or 100° C. to 550° C., or 100° C. to 500° C., or 100° C. to 475° C. In some embodiments, the temperature can be increased at a particular rate for a particular time. For example, the energy source can be operated/programmed to increase the temperature by X° C./minute, wherein X can range from greater than 0 to 20, such as 1 to 15, or 1 to 10, or 2 to 8, or 4 to 6. In particular embodiments, the temperature is increased by 2° C./minute. In some embodiments, exposing the printed intermediate structure to an energy source can also promote conversion of the structural precursor component to the structural material that becomes the base of the printed product. For example, the energy source can promote sintering of metal species (e.g., nanoparticles or the like) formed from the metal precursor component present in the printed intermediate structure so that particles (e.g., nanoparticles) of the metal species are fused together to provide a metal material that forms the base of the printed product.

In some embodiments, the method can further comprise exposing the printed intermediate structure to a flowing inert gas (e.g., Ar, $N_2$, etc.) simultaneously with heating. In additional embodiments, the method can further comprise exposing the printed product to flowing air after the polymer gel has been decomposed so as to remove any residual decomposed polymer gel and/or other chemical contaminants. Upon removal of the decomposed polymer gel, a printed product can be obtained that comprises a first level of porosity achieved by printing the printable composition and a second (typically smaller) level of porosity achieved by removing the polymer gel and leaving behind the structural component formed from the structural precursor. In some embodiments, the size of the printed product can change as the polymer gel is decomposed. In particular disclosed embodiments, isotropic shrinkage of the printed product can take place such that a first level of porosity of the printed product can be obtained that cannot be achieved using conventional porous printing techniques with 3-D printers. As such, the disclosed method provides engineered printed products that have porosities and internal structural details that cannot be obtained with conventional polymer compositions and 3-D printing. Another feature of the disclosed method is that by modifying the concentration of the structural precursor component to the polymer precursor component, the size of the printed product (including the pore volume of the printed product) can be tuned as desired. Size and pore volume also can be tuned by modifying the conditions used for the heating step used to decompose the polymer gel (e.g., by modifying the rate of temperature increase of the energy source, the starting and/or ending temperature of the energy source, the length of time of heating, and any combination thereof).

In yet additional embodiments, the method steps described above (or any combination thereof) can be used in combination with additional method steps that are used to provide one or more additional levels of porosity in the printed product. In some embodiments, an additional method step can comprise exposing the printed intermediate structure to another structural precursor component after exposing the printed intermediate structure to the alcohol used to remove the coating fluid and any residual components still present in the printed intermediate structure, as discussed above. For example, the dried printed intermediate structure obtained after removing the alcohol can be exposed to a composition comprising the additional structural precursor component. Solely by way of example, this composition can comprise a solution of a second metal precursor that is different from the metal precursor used to form the printed intermediate structure. In some exemplary embodiments, a composition comprising a gold-containing precursor (e.g., $HAuCl_4$ and $HAuCl_4 \cdot 3H_2O$) and ethanol and/or water is used. The printed intermediate structure can be immersed or otherwise coated with this composition such that the exterior and internal surfaces of the printed intermediate structure are wetted with the composition. The printed intermediate structure can remain coated/immersed in this composition for a suitable amount of time to allow the additional structural component to deposit on and within the printed intermediate structure to thereby provide a modified printed intermediate structure. In some embodiments, the printed intermediate structure is immersed in the composition for more than 1 hour, such as 2 or more hours, or 2 hours to 24 hours, or 2 hours to 16 hours, or 2 hours to 10 hours.

Subsequently, the modified printed intermediate structure can be exposed to an alcohol rinse. Any number of rinsing steps can be used, but preferably the modified printed intermediate structure is rinsed until the effluent liquid is colorless. The modified printed intermediate structure is then dried (either affirmatively or naturally as described above). However, in some embodiments, if a gold-containing precursor with sufficient solubility so as to form a solution is available, then the gold-containing precursor could be mixed with another metal precursor component (e.g., a silver precursor component) to form an initial mixed metal solution that can be used in the printable composition. In yet some additional embodiments, the printed intermediate structure can be exposed to a vapor-phase reagent, a gas-phase reagent, or another catalyst, or a combination thereof that promotes a chemical change in the structural precursor component (e.g., polymerization, oxide formation, alloying, hardening, or the like) that facilitates conversion of this component to the structural material of the printed product that serves as a majority component of the printed product. Other catalysts that can be used can include metal catalysts (e.g., titania, copper, or other metal catalysts), epoxy-based polymer catalysts (e.g., epichlorohydrin, propylene oxide or similar reagents that can act as reducers, cross-linkers or hardeners), or a volatile hardener catalyst (e.g., a thiol or amine compound), which can provide an epoxy polymer. In some embodiments, the vapor-phase reagent, the gas-phase reagent, or the combination thereof can promote in situ generation of the structural component that makes up the printed product prior to removing the polymer gel.

After drying, the modified printed intermediate structure can be exposed to a heat treatment step as described above for decomposing the polymer gel. In embodiment comprising two different metal precursors as structural components, the heat treatment step not only degrades the polymer gel, but it also alloys (or "fuses") together particles of the two metals formed from the two different metal precursor components, thereby forming a free-standing printed product made up of the two different metals. As such, the heating step also can be used to promote a chemical change in structural precursor component. A de-alloying step can then be performed to selectively remove one of the metal components from regions of the printed product to thereby leave behind another level of porosity within the printed product. The de-alloying step can comprise performing an electrochemical reaction such that one of the metal species is leached from the printed product, or it can comprise exposing the printed product to an etchant, such as an acid to selectively leach one of the metal species from the other. In an exemplary embodiment, an alloyed printed product comprising alloyed silver and gold can be exposed to an acid, such as nitric acid, to leach silver from regions of the printed product, which leaves behind pores formed in the gold. In yet additional embodiments, the printed product can be thermally annealed to modify the pore size of pores formed in the gold and/or to improve the strength of the printed product. These nanoporous gold regions of the printed product form an additional level of porosity within the printed product. In particular disclosed embodiments using a combination of gold and silver, the gold component can be present in an amount ranging from 20 to 40 atomic %, with the silver component making up the remaining atomic %.

Figure 8:
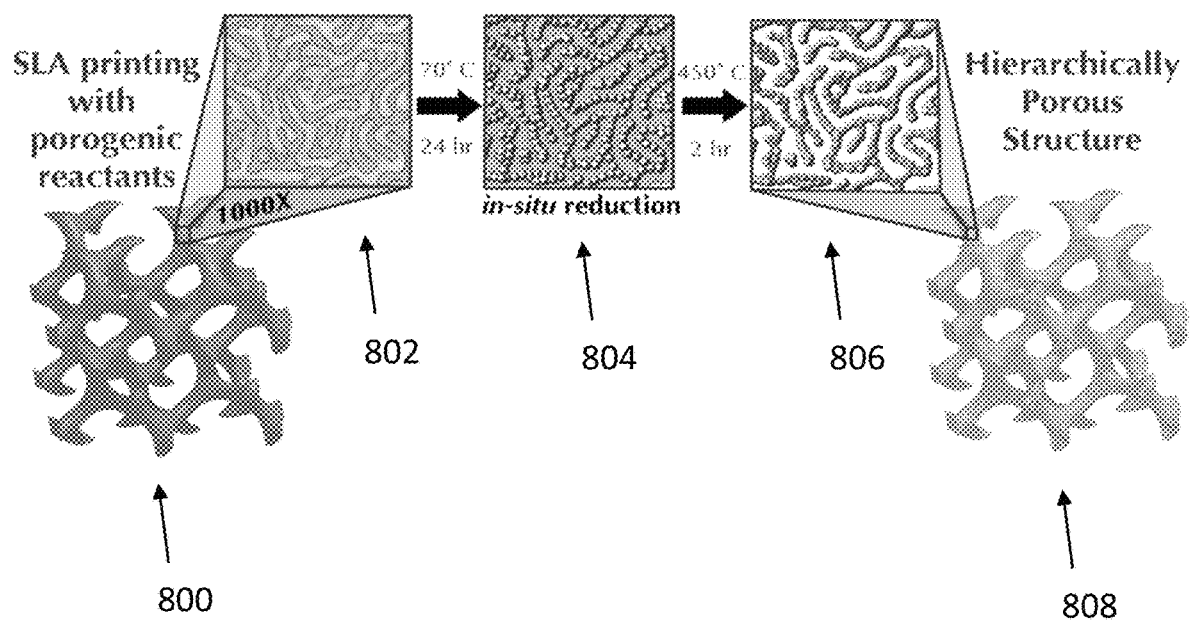
FIG. 8 is a schematic illustration of a representative process by which hierarchical printed products can be formed using method embodiments described herein.

FIG. 8 provides an illustrative schematic of representative stages of printed product formation. In this representative example, a printed structure formed from 3-D printing of a printable composition described herein is illustrated as printed structure 800. As shown in FIG. 8, this printed structure 800 comprises regions that include a mixture of a polymer gel, a porogenic solvent, and a structural precursor component, illustrated as magnified region 802. Upon heating (e.g., whereby the printed structure is heated after it has been exposed to the coating fluid), the structure of the structural precursor component can be modified. For example, as illustrated in FIG. 8, the metal precursor component can be reduced to colloidal metal particles within the polymer gel by heating the mixture of the polymer gel, the porogenic solvent, and the metal precursor. This heating step facilitates reducing the metal precursor to the colloidal metal particles to form a structure having composite regions 804. A further heat treatment can be used to decompose the polymer gel of the composite regions 804 and the exterior surfaces of the printed structure to provide a free-standing printed product 808 comprising regions of a second level of porosity as illustrated in region 806.

In a representative embodiment, a silica-based printed product made using a printable composition comprising a pre-ceramic material comprising tetraethyl orthosilicate is described. In this embodiment, a porogenic solvent composition comprising water, a porogenic solvent (e.g., DMF), and the tetraethyl orthosilicate structural precursor is combined with a polymer precursor component (e.g., polyethylene glycol diacrylate, trimethylolpropane ethoxylate triacrylate, or a combination thereof), an initiator (e.g., an x-hydroxyketone initiator, like IRGACURE®), and a polymerization quenching compound (e.g., a dye, like SUDAN® 1) to form a printable composition. In some embodiments, the amount of the pre-ceramic material can be selected to provide a desired printed product size. Solely by way of example, amounts of the pre-ceramic material lower than 50 uL can be used to provide small (fine) printed products, whereas an amount of the pre-ceramic material above 50 uL (e.g., 1 mL or more) can be used to provide larger printed products. In such embodiments, the amounts of the other printable composition components can be modified (e.g., increased or decreased) so as to provide a final printable composition that is homogenous or substantially homogenous. Once the printable composition has been printed, the printed intermediate structure can be exposed to one or more post-processing steps, including a catalytic hydrolysis step and a heating step. Some embodiments can further comprise a cooling step. In particular representative embodiments, the printed intermediate structure comprising the pre-ceramic material is exposed to a catalyst to promote hydrolysis of the pre-ceramic orthosilicate material to silica. In some embodiments, the catalytic hydrolysis step can comprise exposing the pre-ceramic material to a catalytic gas, such as $NH_3$ gas, which permeates the printed intermediate structure and catalyzes polymerization of the pre-ceramic material to provide a silica-containing printed intermediate structure. In yet additional embodiments, the catalytic hydrolysis step can comprise exposing the pre-ceramic material to a catalytic solution, such as an ammonium hydroxide solution, during the printing process. Once formed, the silica-containing printed intermediate structure is then heated at a temperature and for a time to provide a desired level of porosity, strength, transparency, and/or size by decomposing the polymer gel formed from the polymer precursor components and porogenic solvent of the printable composition. Solely by way of example, exposing the silica-containing printed intermediate structure to a temperature above that which promotes mobility and diffusion of the silica such that sintering and densification may occur (e.g., 1000° C. or higher) can promote increased sintering, which can provide a robust, transparent structure with lower porosity. This temperature, however, can depend on the fineness of the printed structure, the amount of silicon precursor used in the printable composition (which can dictate the overall shrinkage of the printed product at high temperature), how long the printed intermediate structure is exposed to heat (for example, more densification occurs at longer holding times), or any combination thereof. Such embodiments may be desired for optics applications as they can be optically transparent. As yet another example, exposing the silica-containing printed intermediate structure to a temperature below 1500 (e.g., 1300° C. or lower) can promote forming silica-based printed products that have hierarchical porosity. Additional ceramic printed products, such as boron carbide-based products, and methods of making the same, are described in the Examples section of the present disclosure.

VI. Methods of Use

The composition embodiments described herein can be used to make 3D printed products that have multiple different levels of porosity within the printed product's structure. The composition embodiments and printed product embodiments described herein are configured for use in a variety of applications, such as catalysis, heat-transfer technologies, electrodes, sensing/remediation/separation technologies, construction, therapeutics, and the like.

In some embodiments, the composition embodiments and printed product embodiments described herein can be used as heterogeneous catalysis substrates (e.g., pellets, packed tubes, and the like). In some embodiments, the composition embodiments can be used to make printed product embodiments configured for use in heat-transfer technologies, such as heat pipe wicks, heat shielding, passive cooling for microelectronics, heat exchanger components, and the like. In some embodiments, the composition embodiments can be used to make printed product embodiments configured for use in electronics, such as electrodes for use in batteries, electrochemical cells, or other electrochemical capacitor-type devices. In some other embodiments, the composition embodiments can be used to make printed product embodiments configured for use as sensors (e.g., electrical and/or chemical sensors), remediation components (e.g., water purification devices, gas scrubber devices, and the like), and/or separation devices, such as filtration devices and the like. In yet additional embodiments, the composition embodiments can be used to make printed product embodiments configured for use in construction, such as lightweight structural reinforcement, noise reduction, fire protection, and the like. In yet additional embodiments, the composition embodiments can be used to make printed product embodiments configured for use in medical applications, such as therapeutics. For example, printed product embodiments described herein can be used as bone implant scaffolds, or as substrates for growing cell or bacteria cultures in controlled environments.

VII. Overview of Several Embodiments

Disclosed herein are embodiments of a composition, such as a printable composition, comprising: a structural precursor component; a polymer precursor component; and a porogenic solvent. In some embodiments, if the composition comprises polyethylene glycol diacrylate, phenylbis(2,4,6-trimethylbenzoyl)phosphineoxide, 1-phenylazo-2-naphthol, and one or more of isopropanol, pentanol, hexanol, and dibutyl phthalate, then the composition does not comprise silver or silver nitrate without further comprising a second metal or metal precursor; or if the composition comprises resorcinol, formaldehyde, water, polyethylene glycol diacrylate, phenylbis(2,4,6-trimethylbenzoyl)phosphineoxide, and 1-phenylazo-2-naphthol, then the resorcinol, formaldehyde, and water make up a volume % of the composition that is not, or is other than, 80%; and the polyethylene glycol monomer, phenylbis(2,4,6-trimethylbenzoyl)phosphineoxide, and 1-phenylazo-2-naphthol make up a volume % of the composition that is not, or is other than 20%.

In any or all of the above embodiments, the structural precursor component comprises a metal or a metal precursor; a polymer or a monomer precursor to the polymer; a pre-ceramic material; a pre-metal oxide; a carbonaceous material or a precursor thereof; or any combinations thereof.

In any or all of the above embodiments, the metal is selected from silver, gold, nickel, copper, iron, palladium, platinum, zinc, or a combination thereof and wherein the metal precursor is a silver salt, a gold salt, a nickel salt, a palladium salt, a platinum salt, a copper salt, an iron salt, a zinc salt, or any combinations thereof; the monomer precursor to the polymer is an imide monomer, an acrylonitrile monomer, a dicyclopentadiene monomer, a benzoxazine monomer, or any combinations thereof; the pre-ceramic material comprises silicon, titanium, boron, aluminum, zirconium, or any combinations thereof; the pre-metal oxide comprises a titanium oxide precursor, a cobalt oxide precursor, a zirconium oxide precursor, a nickel oxide precursor, a tin oxide precursor, or a combination thereof; the carbonaceous material is graphene, graphite, amorphous carbon, or any combinations thereof; and/or the precursor to the carbonaceous material is resorcinol and formaldehyde.

In any or all of the above embodiments, the polymer precursor component comprises a monomer unit having one or more polymerizable functional groups selected from a double bond, an epoxide, an alkylene oxide, an isocyanate, and the like.

In any or all of the above embodiments, the polymer precursor component is trimethylolpropane ethoxylate triacrylate, divinyl benzene, divinyl sulfone, divinyl oxybutane, polyethylene glycol diacrylate, polyester acrylate, urethane acrylate, epoxy methacrylate, or any combinations thereof.

In any or all of the above embodiments, the porogenic solvent is dimethylformamide, DMSO, water, an alcohol, a hydrocarbon, a weak acid, a weak base, or a combination thereof.

In any or all of the above embodiments, the composition further comprises a polymerization quenching compound, a reducing agent, an initiator, or any combinations thereof.

In any or all of the above embodiments, the composition comprises the initiator and the polymerization quenching compound, wherein the initiator is bis(2,4,6-trimethylbenzoyl)-phenylphosphineoxide and the polymerization quenching compound is an azo-containing dye.

In any or all of the above embodiments, the composition comprises dimethylformamide, silver nitrate, HAuCl$_4$, polyethylene glycol diacrylate, bis(2,4,6-trimethylbenzoyl)-phenylphosphineoxide, and 1-phenylazo-2-naphthol.

In any or all of the above embodiments, the composition comprises dimethylformamide, tetraethyl orthosilicate, polyethylene glycol diacrylate, trimethylolpropane ethoxylate triacrylate, bis(2,4,6-trimethylbenzoyl)-phenylphosphineoxide, and 1-phenylazo-2-naphthol.

In any or all of the above embodiments, the composition comprises phenxoyethyl acrylate, polyethylene glycol diacrylate, DMSO, boric acid, bis(2,4,6-trimethylbenzoyl)-phenylphosphineoxide, and 1-phenylazo-2-naphthol.

Also disclosed herein are embodiments of method for making a printed product, comprising: providing a printable composition according to the present disclosure and/or any or all of the composition embodiments described above; printing a printed intermediate structure with the composition by using a 3-D printer or other stereolithographic process to deposit layers of the composition and exposing the layers to an energy source to polymerize the polymer precursor component of the composition to thereby form a polymer gel; heating the printed intermediate structure at a temperature and for a time sufficient to promote a chemical change in the structural precursor component and/or to decompose the polymer gel; and removing decomposed polymer gel from the structure to provide the printed product.

In any or all of the above embodiments, heating the structure at a temperature and for a time sufficient to promote chemical changes in the structural precursor component and/or to decompose the polymer gel comprises (i) a first heating step wherein the structure is heated to promote reduction of the structural precursor component and a second heating step wherein the structure is heated to decompose the polymer; or (ii) a single heating step wherein the structural precursor component is reduced and the polymer gel decomposes.

In any or all of the above embodiments, the method further comprises exposing the printed intermediate structure to a vapor-phase reagent, a gas-phase reagent, a catalyst, or a combination thereof to promote a chemical change in the structural precursor component.

In any or all of the above embodiments, removing decomposed polymer gel from the structure to provide the printed product comprises exposing the structure to flowing air during or after heating.

In any or all of the above embodiments, the method further comprises exposing the structure to a coating fluid prior to heating the structure and/or rinsing the structure with a rinsing composition.

In any or all of the above embodiments, the coating fluid is an oil capable of preventing evaporation of the porogenic solvent and/or ion transport of ions formed during heating.

In some embodiments, the method comprises: mixing a composition comprising an initiator, a polymerization quenching compound, and a porogenic solvent with a polymer precursor to form a first mixture; adding a solution comprising a metal precursor and water to the first mixture to provide a second mixture; printing a printed intermediate structure with the second mixture using a 3-D printer or other stereolithographic process to deposit layers of the second mixture and exposing the layers to an energy source to polymerize the polymer precursor component to thereby form a polymer gel; rinsing the printed intermediate structure with a rinsing solution comprising the porogenic solvent and a stabilizing component; heating the printed intermediate structure at a temperature and for a time sufficient to promote chemical changes in the metal precursor component and/or to decompose the polymer gel; and removing decomposed polymer gel from the printed intermediate structure to provide the printed product.

Also disclosed herein are embodiments of a printed product, comprising a combination of macroscale pores and/or channels and microscale pores and/or channels; or a combination of macroscale pores and/or channels and nanoscale pores and/or channels; or a combination of microscale pores and/or channels and nanoscale pores and/or channels; or a combination of macroscale pores and/or channels, microscale pores and/or channels, and nanoscale pores and/or channels, wherein the printed product comprises a metal other than silver, a metal alloy, a ceramic material, a polymer, a metal oxide, a carbonaceous material, or any combination thereof; and wherein the macroscale pores and/or channels, the microscale pores and/or channels, and/or the nanoscale pores and/or channels are formed throughout the printed product.

In some embodiments, the structural component comprises a combination of silver and gold; gold; silica; iron; copper; boron carbide; resorcinol; or a combination thereof.

VIII. Examples

Example 1

In this example, a representative method for making a 3-D printed hierarchical silver foam material is described. In this example, Solutions A-C are prepared and mixed in the particular order described below.

Solution A: 100 mg of Bis(2,4,6-trimethylbenzoyl)-phenylphosphineoxide and 18 mg of SUDAN® 1 dye are dissolved in 20 mL of dimethylformamide (DMF). The phosphine oxide acts as a radial initiator for polymerization and the dye acts as a polymerization quenching compound to control the thickness of printed layers and to prevent polymerization from occurring outside the exposed regions for each printed cross-section. The DMF acts as a porogenic solvent to produce a polymeric gel, and a robust reducing agent for silver ions that are incorporated into the printable composition (see solution C).

Solution B: Solution of ethoxylated (3) trimethylolpropane triacrylate (neat).

Solution C: A solution containing silver nitrate and deionized water, wherein 2 grams of dissolved silver nitrate is used for every 1 mL of deionized water.

Solution D: A 75:25 (by volume) mixture of DMF and 10% w/w polyvinylpyrrolidone (PVP) dissolved in deionized water.

Printable Composition Preparation: The printable composition comprises 57.1% Solution A, 28.5% Solution B, and 14.4% Solution C by volume. In this example, 3.5 mL of printable composition is prepared by mixing 2 mL Solution A, 1 mL Solution B, and 0.5 mL Solution C. As Solution C is only miscible with Solution B in the presence of Solution A, Solutions A and B are first mixed together, followed by the addition of Solution C. This order of addition can, in some embodiments, prevent formation of an emulsion that results in phase separation.

Printing: The printable composition is then loaded into a vat-type stereolithography 3-D printer and models are printed using optimized settings specific to each model and/or printing device. The printer specifications (e.g., light source type and intensity; bottom-up or top-down orientation of the printer, etc.) can be tuned/modified as needed. In this example, the hierarchical foam material is made by choosing a printing models that has intrinsic porosity (e.g., lattices, gyroid structures, and other porous models). Immediately after printing the large-scale, resulting pores formed from the printing can still be filled with excess printable composition due to capillary action, and the walls of the printed structure can be coated with excess printable composition. In some embodiments, the printed models are briefly "wicked" of their excess printable composition by placing them on a Kimwipe or similar material to drain the larger pores of their excess non-polymerized fluid. Then, the structures are briefly rinsed with a Solution D, described above.

Figure 9:
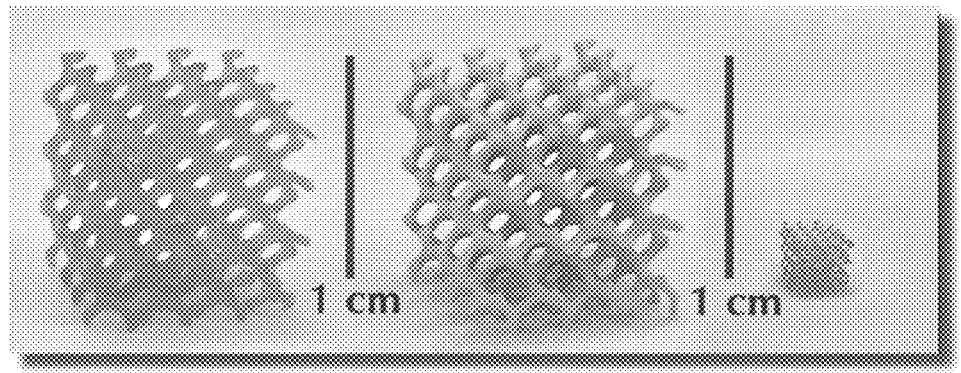
FIG. 9 is an image of a printed product formed using composition and method embodiments described herein, which illustrates a printed product before and after a processing method that facilitates isotropic shrinkage thereby reducing feature sizes far below the printed resolution (as can be seen by comparing the left-most and middle images with the right-most image).

The amount of solution D used to rinse the structures depends on the model size, shape and porosity. Solely by way of example, for a 1 cm$^3$ printed model with printed pores that are ~250 μm in diameter, roughly 1-2 mL of solution D is deposited on the printed model (sitting on a Kimwipe) such that it passes through the structure and rinses the walls of uncured monomer. A rinsed printed structure is shown in the left-most image of FIG. 9. The PVP also acts as a stabilizer for silver nanoparticles that restricts their growth but only on the outer surfaces of the printed model (that is, not within the gel phase).

After rinsing, the structures are placed in vials to which sufficient silicone oil (or another compatible oil) is then added to cover the structure entirely and fill the pores of the printed structure. The oil is not miscible with the remaining fluids within the polymeric gel (e.g. DMF/water) and therefore acts as a "liquid shrink-wrap" for the porous printed structures and thus can prevent solvent evaporation or ion transport from the inner regions of the walls to the outer surfaces. The vial is then sealed and placed in an oven to carry out the reduction of silver ions by DMF and water. The temperature can be 70° C. and the vial is left in the oven for at least 4 hours.

After the reduction of silver ions is completed within the polymer gel structure, the silicone oil in the vial along with the remaining fluid within the structures (this would now be residual DMF/water plus any by-products of the silver reduction reaction described above) are exchanged with ethanol, and the structures are then dried at room temperature. A dried structure is shown in the middle image of FIG. 9.

To produce the metallic foams, the polymer is decomposed and the silver particles are sintered to produce a freestanding structure. The printed structures are placed in a furnace operating under flowing inert gas (Ar, N$_2$, etc.). A typical furnace program is to ramp from room temperature to 475° C. at a rate of 2° C./min. Then, while still at 475° C., the inert gas is shut off and the flowing gas is switched over to air, which removes any remaining carbon products from the polymer matrix to produce silver structures free of chemical contaminants. A digital image of a silver foam is shown in the right-most image of FIG. 9. Scanning electron microscopy images clearly show two distinct pore networks, one from the printed structure itself, and a smaller sponge-like network from the structural inversion of the polymer gel phase by sintered silver nanoparticles.

Example 2

In this example, a third level of structural hierarchy is achieved by beginning with a silver-filled composite structure obtained from the procedure described above for Example 1, which is rinsed thoroughly with ethanol and dried at room temperature. This structure is then placed in a vial containing a Solution E, which comprises 50 mg of dissolved HAuCl$_4$ per 1 mL ethanol, water, or a combination thereof. The volume of solution E is optimized to completely immerse the structure in solution and wet all of the internal surfaces of the object. The structure is left in the solution for 16 hours or more, during which gold nanoparticles are deposited within the walls and onto the internal surfaces of the structure. The structures are again rinsed in ethanol until the effluent liquid is colorless, and again dried at room temperature. Then, the composite Au/Ag/polymer structures are placed in a tube furnace using a similar protocol as described above in Example 1. Finally, the silver component of the alloy is removed by placing the metal alloy in concentrated HNO$_3$ to leach the silver out of the structure and produce nanoporous gold. This last nanoscale structure is even smaller than the polymeric gel phase, and therefore three levels of porosity are present in these materials: (1) the printed structure, (2) the inverse replica of the polymeric gel phase, and (3) interconnected nanopores from de-alloying of the Au/Ag alloy (see FIG. 2).

Figure 10A:
FIGS. 10A-10F provide images of a gold-based printed product made according to a method embodiment of the present disclosure.
Figure 10B:
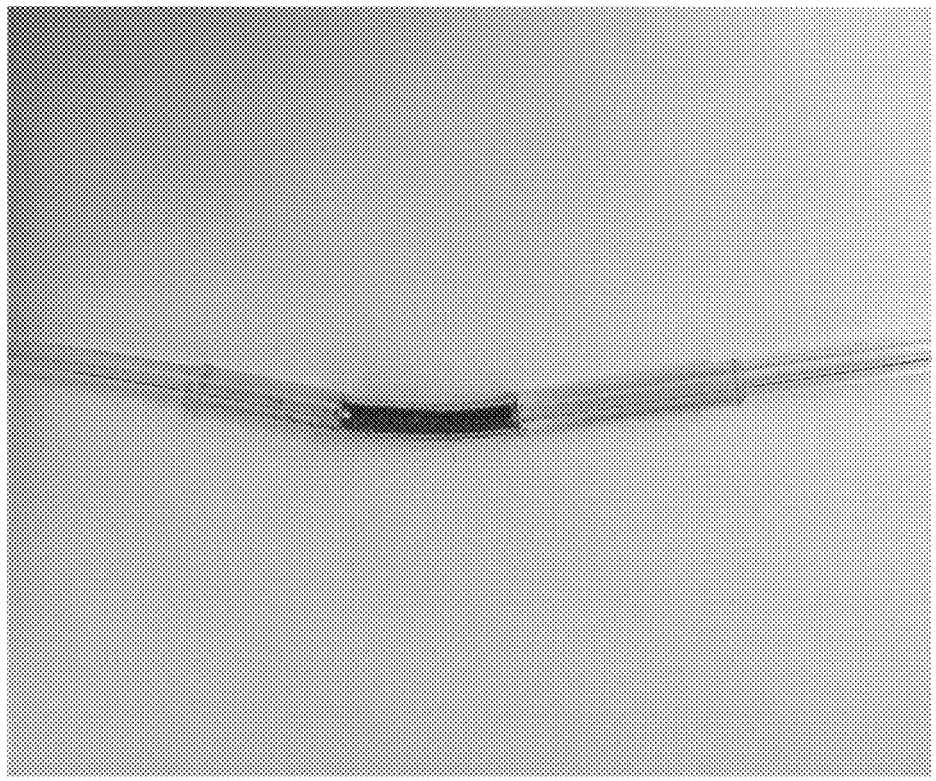
Figure 10C:
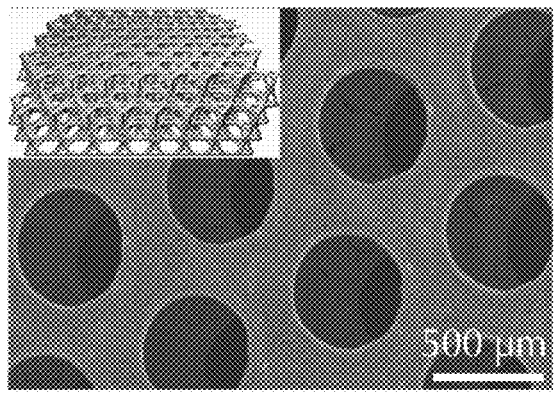
Figure 10D:
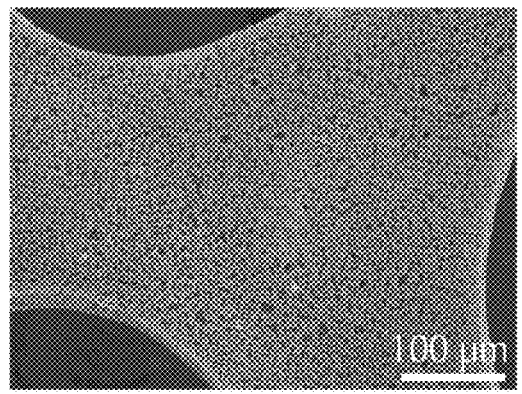
Figure 10E:
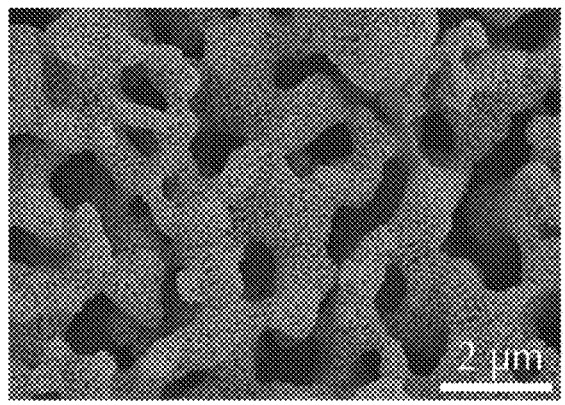
Figure 10F:
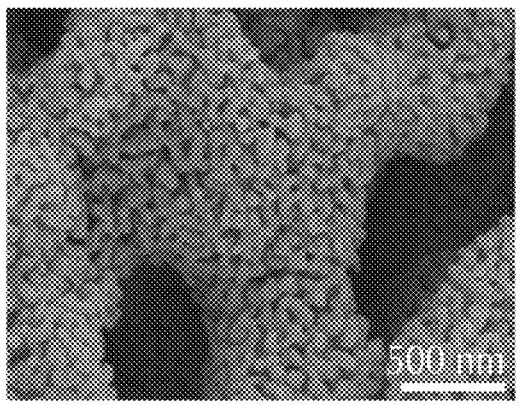

An additional example of a gold printed product is shown in FIGS. 10A-10F. FIG. 10A shows a trimodal porous gold printed product and FIG. 10B shows the printed product after being incorporated into a flow-through reactor for catalysis. FIGS. 10C-10F are SEM images of the gold printed product that show that the hierarchical porous network of the product is continuous and accessible from the bulk void volume with no discontinuities or blockage of the pores.

Example 3

In this example, a carbonaceous precursor material is used to form a carbon-based printed product. To make the printed product, 25% by volume poly(ethylene glycol) diacrylate (e.g., MW 250) is combined with 75% by volume water and formaldehyde solution with dissolved resorcinol. The initiator/absorber (SUDAN® 1) concentration relative to mass of the polymer precursor component (i.e., poly(ethylene glycol) diacrylate) is 1% and 0.18%, respectively. Using a similar processing procedure as described herein, the resorcinol/formaldehyde solution and water are reacted so as to form the carbonaceous material upon heating. Also during heating (or by using higher temperatures in a subsequent heating step), the PEG-containing polymer is decomposed to provide the free standing printed product made of the carbonaceous material.

Example 4

In this example, a metal oxide-based printed product is made. A concentrated amount of cobalt nitrate is used as a pre-metal oxide material and, after printing a printable composition comprising the cobalt nitrate, as well as a polymer precursor component, the resulting printed intermediate structure is heated in air to first produce cobalt oxide (e.g., at 100° C.) and then heating in air is continued at higher temperatures (e.g., 400° C.) to remove the polymer gel and produce the cobalt oxide replica.

Example 5

In this example, a hierarchical silica-based printed product was made. A porogenic solvent comprising a combination of 1 mL H$_2$O, 2 mL DMF, and 300 uL tetraethylorthosilicate was prepared. To this solvent mixture was added 3 mL PEG diacrylate and 1 mL trimethylolpropane ethoxylate triacrylate, 20 mg IRGACURE® 819, 3.6 mg SUDAN® 1. In some embodiments, the amount of tetraethylorthosilicate can be varied widely to control the amount of shrinkage during the heating step. For example, when a very fine structure is desired as the final product, 50 uL or less of TEOS is added. When a larger structure is desired, 1 mL or more TEOS is added. In one example, 10 mg IRGACURE®, 1.8 mg SUDAN® 1, 1 mL DMF, 1.5 mL PEG diacrylate, and 1.5 mL TEOS was used. The other solvent amounts can be adjusted to ensure that the final printable composition is fully mixed and homogeneous.

After printing printed intermediate structure with the above-described composition, the printed intermediate structure was placed in a chamber filled with $NH_3$ gas and allowed to rest for 12 hours. The gas permeated the part, catalyzing the polymerization of TEOS to yield silica.

Figure 11A:
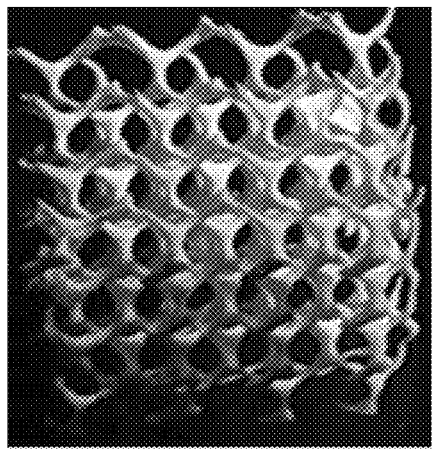
FIGS. 11A-11E provides images of a silica-based printed product made according to a method embodiment of the present disclosure.
Figure 11B:
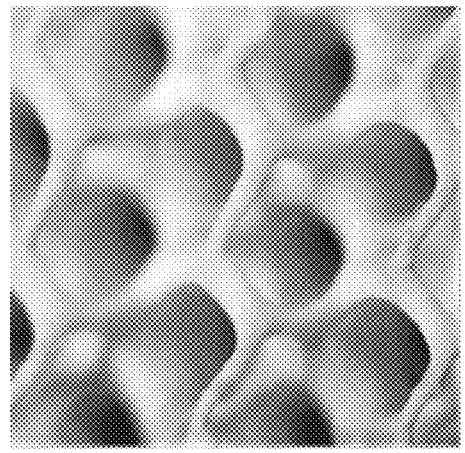
Figure 11C:
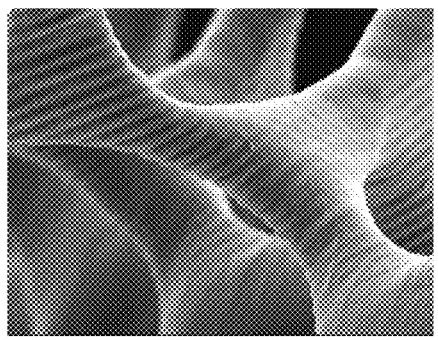
Figure 11D:
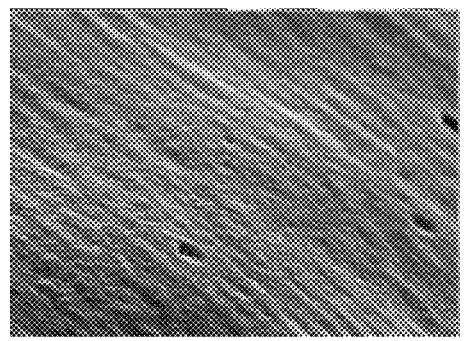
Figure 11E:
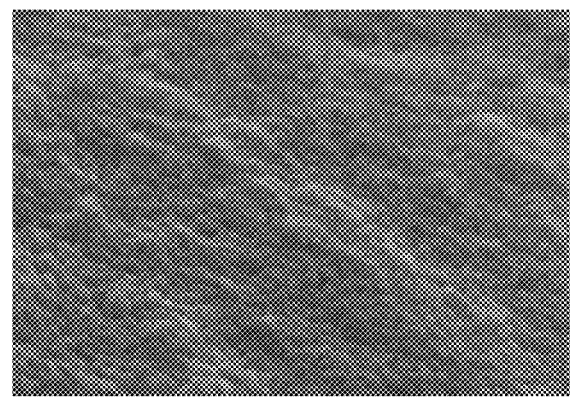

Next, the printed intermediate structure was heated in a tube furnace from room temperature to 300° C. over 4 hours, then to 1000° C. over 5 hours. The furnace was then shut down and allowed to cool naturally, providing the silica-based printed product. The silica-based ceramic printed product is shown in FIGS. 11A-11E. FIG. 11A shows a freestanding silica product made using an embodiment of the method discussed above. FIGS. 11B and 11C are expanded views of the product in FIG. 11A, showing the macro-sized pores of the product. FIGS. 11D and 11E show finer pores formed in the printed product, which provide a second level of porosity that exists on length scales smaller than the macro-sized pores.

Example 6

Figure 12:
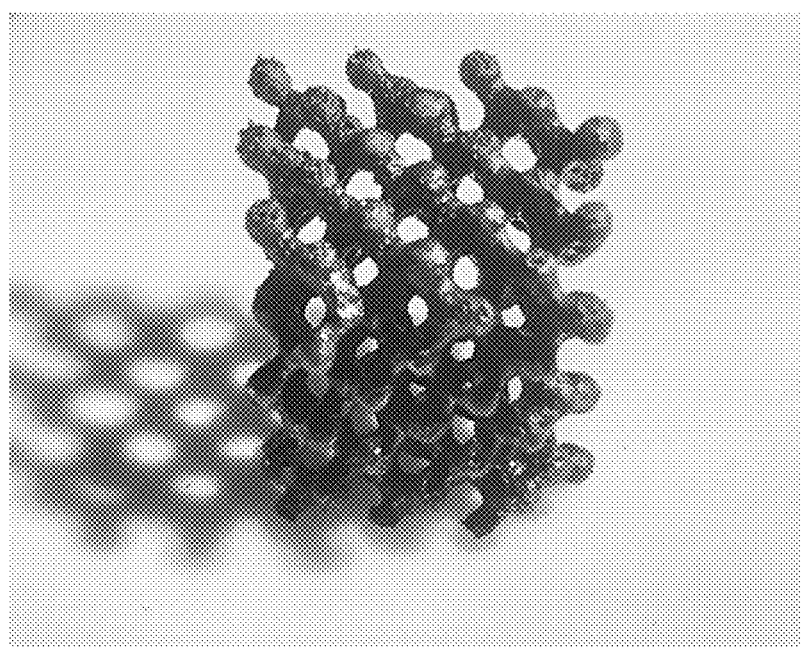
FIG. 12 is a digital image of a boron carbide-based printed product made using a method embodiment of the present disclosure.
Figure 13:
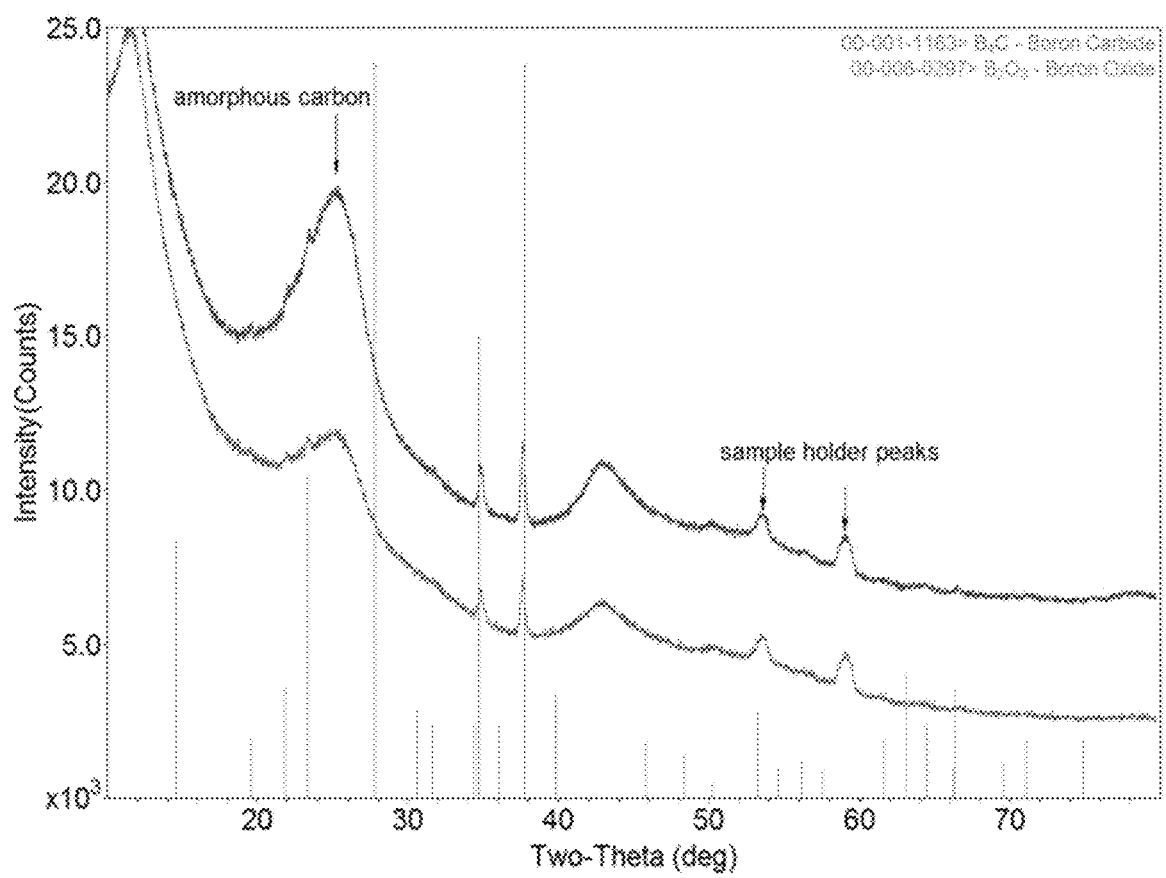
FIG. 13 is an X-ray diffraction pattern obtained from analyzing a pulverized sample of the boron carbide-based printed product shown in FIG. 12.

In this example, a boron carbide-based hierarchically porous printed structure was made. A printable composition comprising 1 mL trimethylolpropane triacrylate, 1 mL phenoxyethyl acrylate, 1 mL PEG diacrylate, 5.5 mL saturated DMSO solution of boric acid, 500 uL DMSO, 20 mg IRGACURE®, and 5.4 mg SUDAN® 1. An object was printed with the printable composition using a 3-D printer and was dried of any excess liquid printable composition and subjected to the follow heat treatment steps: (i) exposure to an initial temperature of 100° C., with ramping up to 200° C. over 12 hours under $N_2$; (ii) exposure to an initial temperature of 200° C., with ramping up to 500° C. over 5 hours under $N_2$; (iii) holding at a temperature of 500° C. for 48 hours under $N_2$; then (iv) a temperature ramping step where the temperature was quickly increased 5-10° C./min to 1000° C. under air; (v) holding at a temperature of 1000° C. for 2 hours; (vi) exposure to nitrogen at 1000° C. for another 3 hours; and (vii) a cooling step under nitrogen. The printed product of this example is shown in FIG. 12 and FIG. 13 provides the XRD pattern for the printed product obtained from using X-ray diffraction analysis on a pulverized sample of the printed product.

Example 7

In this example, another boron carbide-containing hierarchically porous printed object was made. First, a hierarchical porous printed polymer product was made as described in Example 6. In particular, the printed polymer product was formed using a printable composition comprising 10 mg IRGACURE®, 1.8 mg SUDAN® 1, 0.5 mL water, and 1 mL of PEGDA MW 600. The polymer product was then soaked in a solution of boric acid-sucrose ester in DMF, which was prepared by heating 3 mL DMF with 1 g boric acid and 800 mg sucrose at 100° C. until the solution was black and viscous. After soaking the printed intermediate structure in this solution for several days, the printed intermediate structure was fired to give a boron-carbide containing composite material. This example can be modified to control the amount of carbon present in the final product by modifying the heating program. For example, the printed intermediate structure can be exposed to a high temperature environment for a suitable period of time in the presence of oxygen to provide reduced amounts of carbon-based polymer gel present in the printed product.

Example 8

Figure 14A:
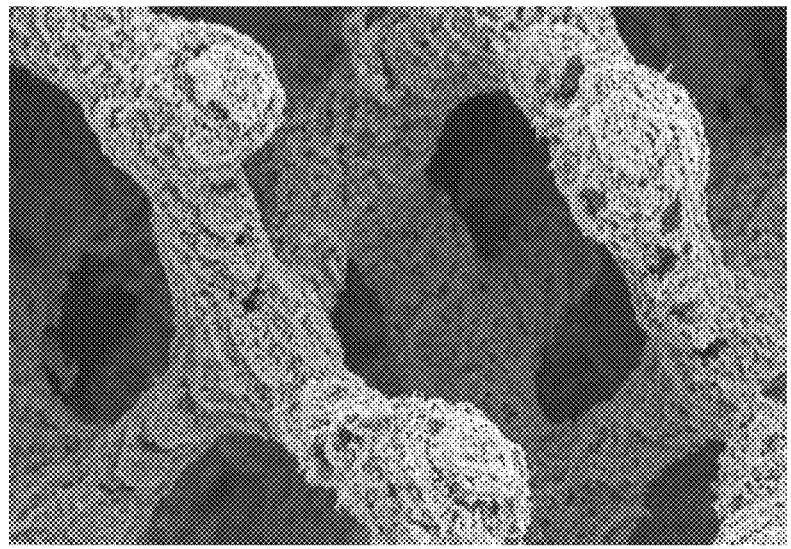
Figure 14B:
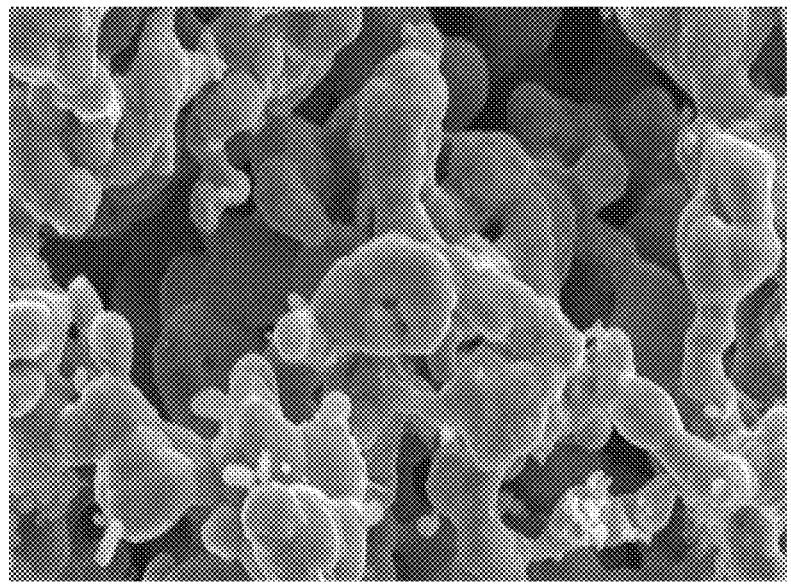

In this example, a method for making a copper-based printed product is described. A printed intermediate structure comprising a polymer formed from a polymer precursor component was soaked in a saturated water solution of ascorbic acid overnight and then soaked in a saturated ethanol solution of copper chloride for 24 hours. The printed intermediate structure was then dried, either via evaporation, freeze-drying, or supercritical drying, and fired to remove the polymer gel. In some embodiments of this example, gas flow and temperature were controlled to ensure that the copper particles sinter together before oxidizing, and that the copper was not oxidized to the point that the structure of the part is compromised. Forming gas may be used in some examples to reduce the copper at desirable intervals. Images of the printed product formed from this example are provided in FIGS. 14A and 14B, wherein FIG. 14A is an SEM image of the printed product on a 200 μm scale and FIG. 14B is an SEM image of the printed product on a 5 μm scale Example 9

Figure 15A:
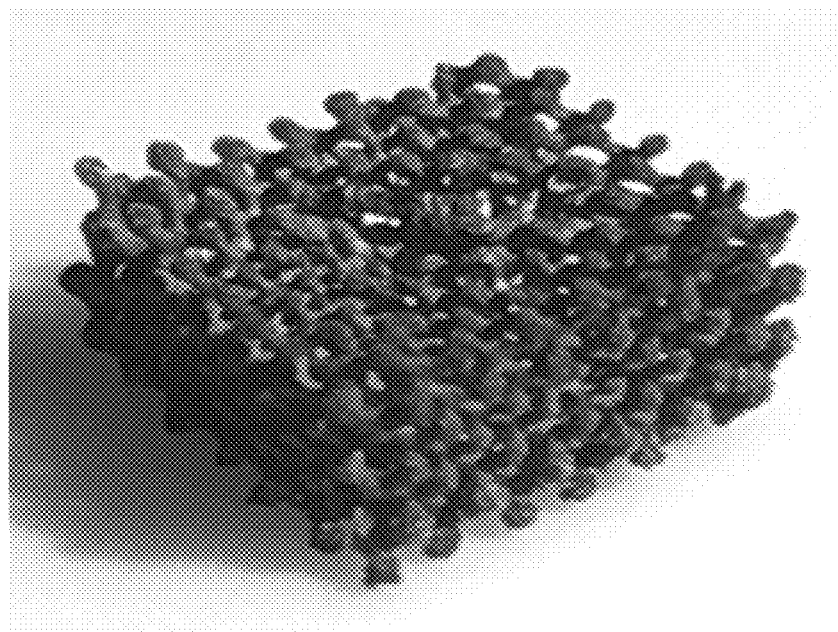
FIGS. 15A-15C provide images of an iron-based printed product made according to a method embodiment of the present disclosure.
Figure 15B:
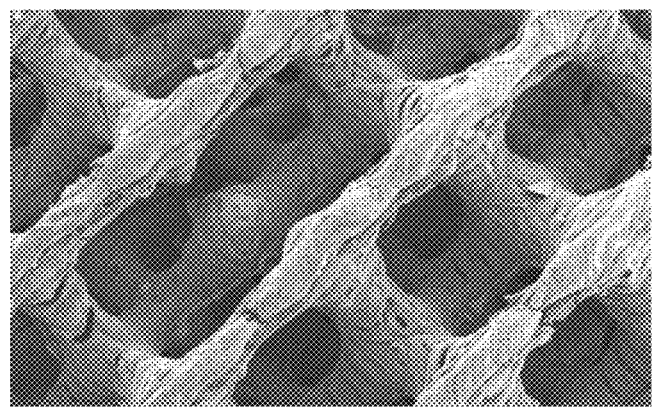
Figure 15C:
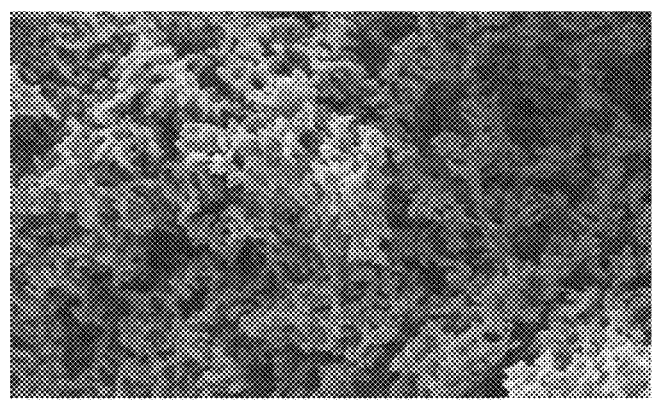

In this example, a method of making an iron-based printed product is described. A printed intermediate structure comprising a polymer formed from a polymer precursor component was soaked in a saturated water solution of iron nitrate and then dried via evaporation, freeze drying or supercritical drying to remove any liquid solvent and then fired according to the following program: (i) increasing the temperature from 30° C. to 500° C. over 5 hours in nitrogen; holding at 500° C. for 1 hour in nitrogen; holding at 500° C. for 5 hours in air; increasing the temperature from 500° C. to 800° C. over 1 hour in forming gas; and holding the temperature at 800° C. for 6 hours in forming gas. An image of the printed product from this example is shown in FIG. 15A and FIGS. 15B and 15C provide SEM images of pores of the product on a 200 μm scale and 10 μm scale, respectively.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A method, comprising:
mixing a composition comprising bis(2,4,6-trimethylbenzol)-phenylphosphineoxide, 1-phenylazo-2-naphthol, and dimethylformamide with polyethylene glycol diacrylate to form a first mixture;
adding a solution comprising a metal precursor component comprising a combination of silver nitrate and $HAuCl_4$ and water to the first mixture to form a second mixture;
printing, with the second mixture, a printed intermediate structure comprising a polymer gel by using a 3-D printer or other stereolithographic process to deposit layers of the second mixture and exposing the layers of the second mixture to an energy source to polymerize the polyethylene glycol diacrylate to thereby form the polymer gel;
rinsing the printed intermediate structure with a rinsing solution comprising a porogenic solvent and a stabilizing component;
heating the printed intermediate structure at a temperature and for a time sufficient to promote chemical changes in the metal precursor component and/or to decompose the polymer gel; and removing decomposed polymer gel from the printed intermediate structure to provide a metal-based printed product.

2. The method of claim 1, wherein removing the decomposed polymer gel from the printed intermediate structure comprises exposing the printed intermediate structure to a flowing inert gas simultaneously with heat.

3. The method of claim 1, wherein heating the printed intermediate structure comprises heating it at a temperature ranging from greater than room temperature to 700° C.

4. The method of claim 1, wherein the composition further comprises a reducing agent and/or the method further comprises exposing the printed product to an acid.

* * * * *